US012712751B2

(12) United States Patent
Mayuzumi

(10) Patent No.: US 12,712,751 B2
(45) Date of Patent: Aug. 18, 2026

(54) INTERMEDIARY SERVER, SYSTEM, INTERMEDIATING METHOD, AND NON-TRANSITORY RECORDING MEDIUM

(71) Applicant: Ryusuke Mayuzumi, Kanagawa (JP)

(72) Inventor: Ryusuke Mayuzumi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 352 days.

(21) Appl. No.: 17/943,211

(22) Filed: Sep. 13, 2022

(65) Prior Publication Data

US 2023/0006847 A1 Jan. 5, 2023

Related U.S. Application Data

(63) Continuation of application No. PCT/JP2021/008688, filed on Mar. 5, 2021.

(30) Foreign Application Priority Data

Mar. 19, 2020 (JP) ................................ 2020-049892
May 21, 2020 (JP) ................................ 2020-088549
Feb. 5, 2021 (JP) ................................ 2021-017111

(51) Int. Cl.
*G06Q 50/06* (2024.01)
*H04L 9/00* (2022.01)
*H04L 9/32* (2006.01)

(52) U.S. Cl.
CPC .................. *H04L 9/50* (2022.05); *H04L 9/32* (2013.01); *G06Q 50/06* (2013.01)

(58) Field of Classification Search
CPC ...... G06Q 50/06; G06Q 2220/00; H04L 9/50; H04L 9/32; G06F 2221/2135
See application file for complete search history.

(56) References Cited

U.S. PATENT DOCUMENTS

2002/0194012 A1* 12/2002 Maekawa ............. G06Q 30/06 705/412
2019/0086235 A1* 3/2019 Cui ..................... H04L 63/0435
2019/0164236 A1* 5/2019 Mayne ................ G06Q 20/389
(Continued)

FOREIGN PATENT DOCUMENTS

JP 2001184406 A 7/2001
JP 2003-006289 1/2003
(Continued)

OTHER PUBLICATIONS

A. Salian, S. Shah, J. Shah and K. Samdani, "Review of Blockchain Enabled Decentralized Energy Trading Mechanisms," 2019 IEEE International Conference on System, Computation, Automation and Networking (ICSCAN), Pondicherry, India, 2019, pp. 1-7, doi: 10.1109/ICSCAN.2019.8878731 (Year: 2019).*
(Continued)

*Primary Examiner* — Michael P Harrington
(74) *Attorney, Agent, or Firm* — XSENSUS LLP

(57) ABSTRACT

An intermediary server for intermediating transfer of ownership of energy between a supplier and a user, includes circuitry that receives usage information indicating that energy has been used from a communication terminal of the user, and transmits, to a decentralized ledger system, a request for changing ownership of the energy from the previous owner to the user based on the usage information.

13 Claims, 19 Drawing Sheets

(56) References Cited

U.S. PATENT DOCUMENTS

| | | | | |
|---|---|---|---|---|
| 2019/0272601 | A1 | 9/2019 | Unagami et al. | |
| 2019/0318425 | A1* | 10/2019 | Tilley | G06Q 20/223 |
| 2021/0217110 | A1* | 7/2021 | Anglin | H02J 13/00007 |

FOREIGN PATENT DOCUMENTS

| | | |
|---|---|---|
| JP | 2007-094732 | 4/2007 |
| JP | 2009070083 A | 4/2009 |
| JP | 2016-200933 | 12/2016 |
| JP | 2018-173692 | 11/2018 |
| JP | 2019-028827 | 2/2019 |
| JP | 2019-144851 | 8/2019 |
| JP | 2019-153275 | 9/2019 |
| JP | 2019-169105 | 10/2019 |
| JP | 2019-175417 | 10/2019 |
| JP | 2019-185412 | 10/2019 |
| WO | 2019/141511 A1 | 7/2019 |

OTHER PUBLICATIONS

Extended European Search Report received for European Patent Application No. 21772310.5 mailed on Feb. 28, 2024, 7 pages.

International Search Report issued on Jun. 1, 2021 in PCT/JP2021/008688 filed on Mar. 5, 2021, 6 pages.

Office Action issued Jun. 24, 2025 in corresponding Japanese Patent Application No. 2024-108321.

* cited by examiner

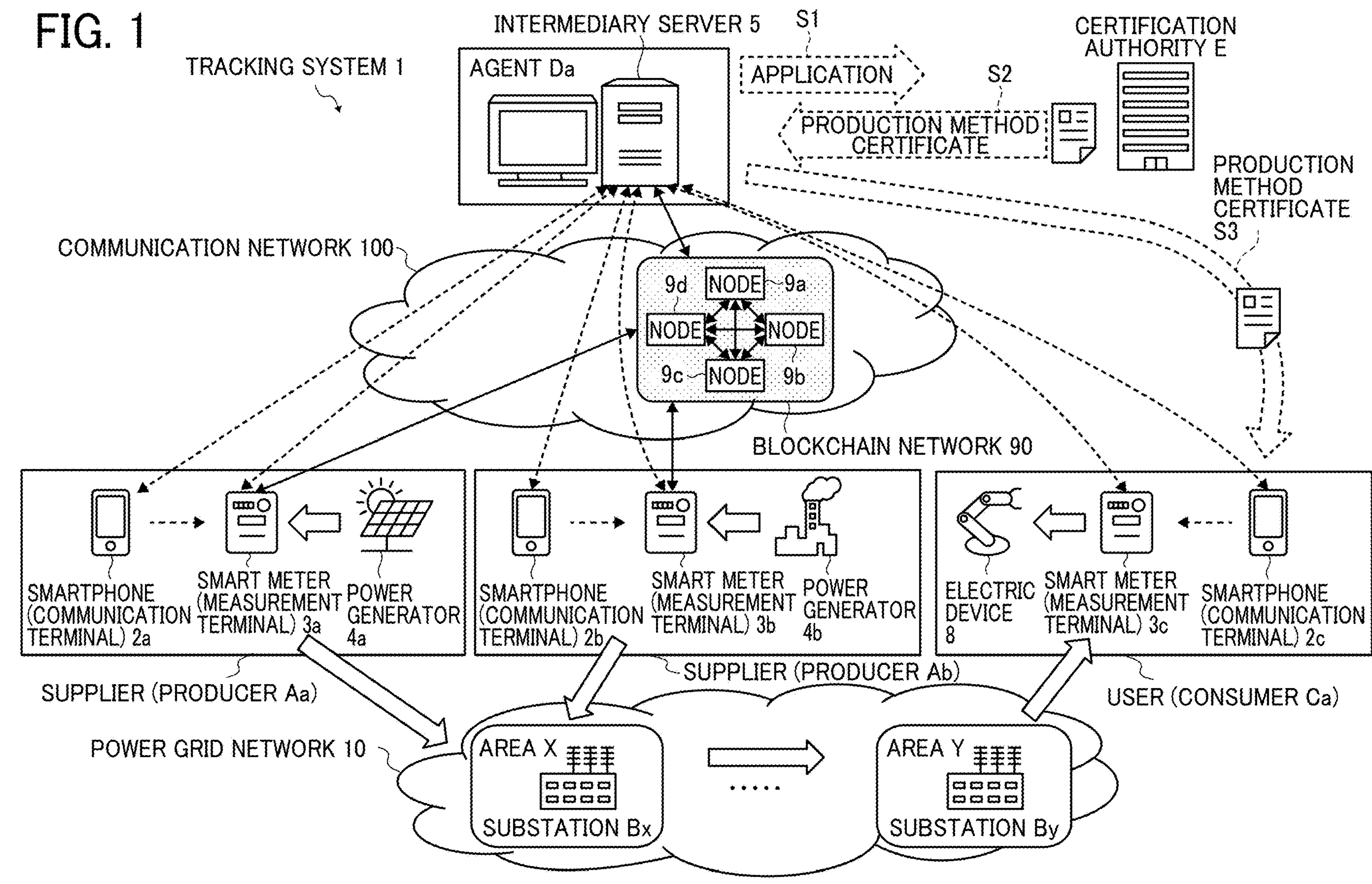
FIG. 1
TRACKING SYSTEM 1
INTERMEDIARY SERVER 5
AGENT Da
S1
APPLICATION
S2
PRODUCTION METHOD CERTIFICATE
CERTIFICATION AUTHORITY E
PRODUCTION METHOD CERTIFICATE S3
COMMUNICATION NETWORK 100
NODE
9a
NODE
9b
NODE
9c
NODE
9d
BLOCKCHAIN NETWORK 90
SMARTPHONE (COMMUNICATION TERMINAL) 2a
SMART METER (MEASUREMENT TERMINAL) 3a
POWER GENERATOR 4a
SMARTPHONE (COMMUNICATION TERMINAL) 2b
SMART METER (MEASUREMENT TERMINAL) 3b
POWER GENERATOR 4b
ELECTRIC DEVICE 8
SMART METER (MEASUREMENT TERMINAL) 3c
SMARTPHONE (COMMUNICATION TERMINAL) 2c
SUPPLIER (PRODUCER Aa)
SUPPLIER (PRODUCER Ab)
USER (CONSUMER Ca)
POWER GRID NETWORK 10
AREA X
SUBSTATION Bx
AREA Y
SUBSTATION By 2
SMARTPHONE
212a
LONG-RANGE COMMUNICATION CIRCUIT
212
CMOS
213
IMAGING ELEMENT I/F
214
MICROPHONE
215
AUDIO I/O I/F
SPEAKER
216
217
DISPLAY
218
EXTERNAL DEVICE CONNECTION I/F
219
SHORT-RANGE COMMUNICATION CIRCUIT
220
220a
TOUCH PANEL
221
210
CPU
201
ROM
202
RAM
203
EEPROM
204
IMAGING ELEMENT I/F
206
CMOS
205
ACCELERATION AND ORIENTATION SENSOR
207
MEDIA I/F
209
MEDIA
208
GPS RECEIVER
211

FIG. 3

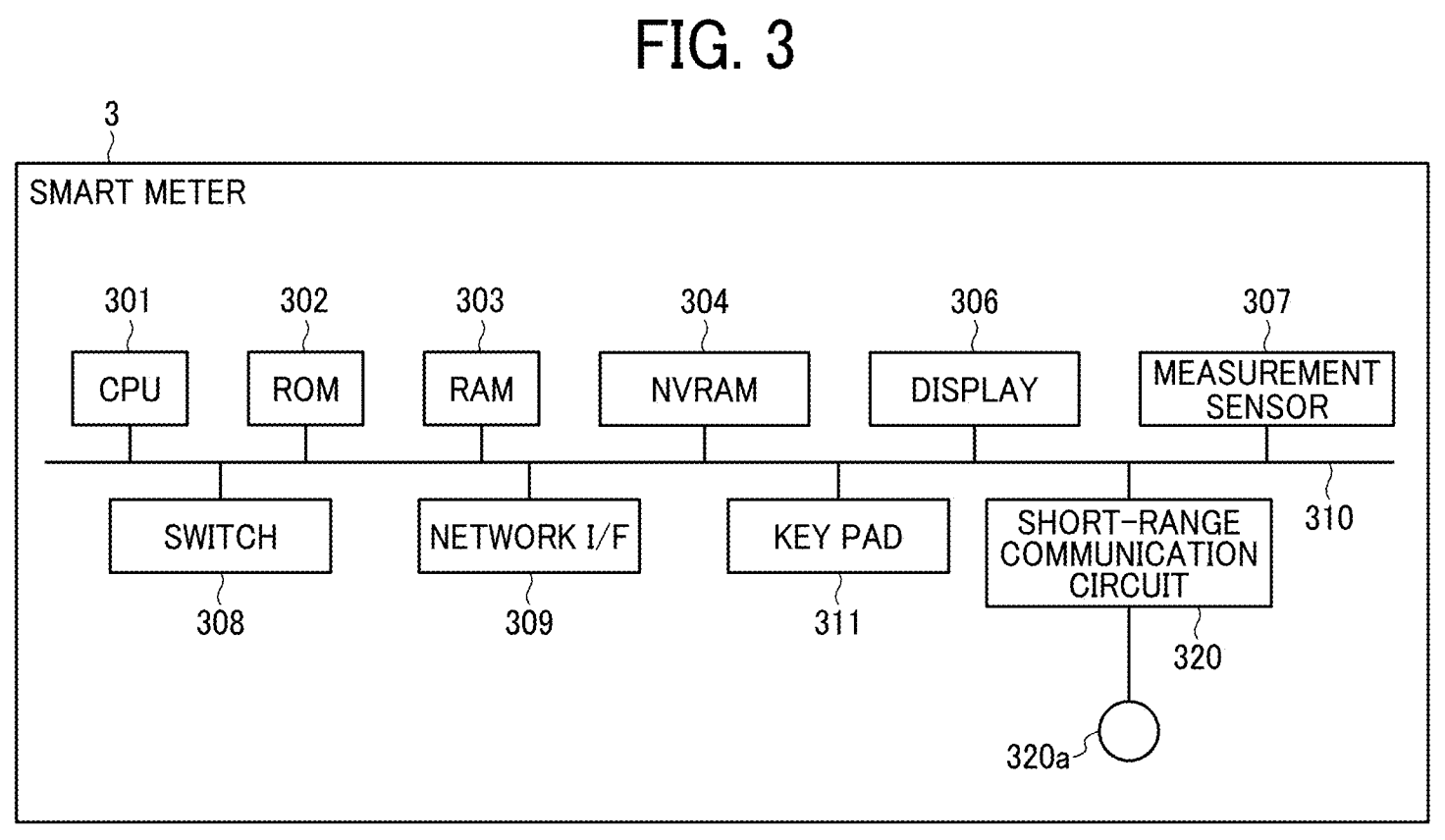

3 SMART METER

301 CPU

302 ROM

303 RAM

304 NVRAM

306 DISPLAY

307 MEASUREMENT SENSOR

308 SWITCH

309 NETWORK I/F

310

311 KEY PAD

320 SHORT-RANGE COMMUNICATION CIRCUIT

320a

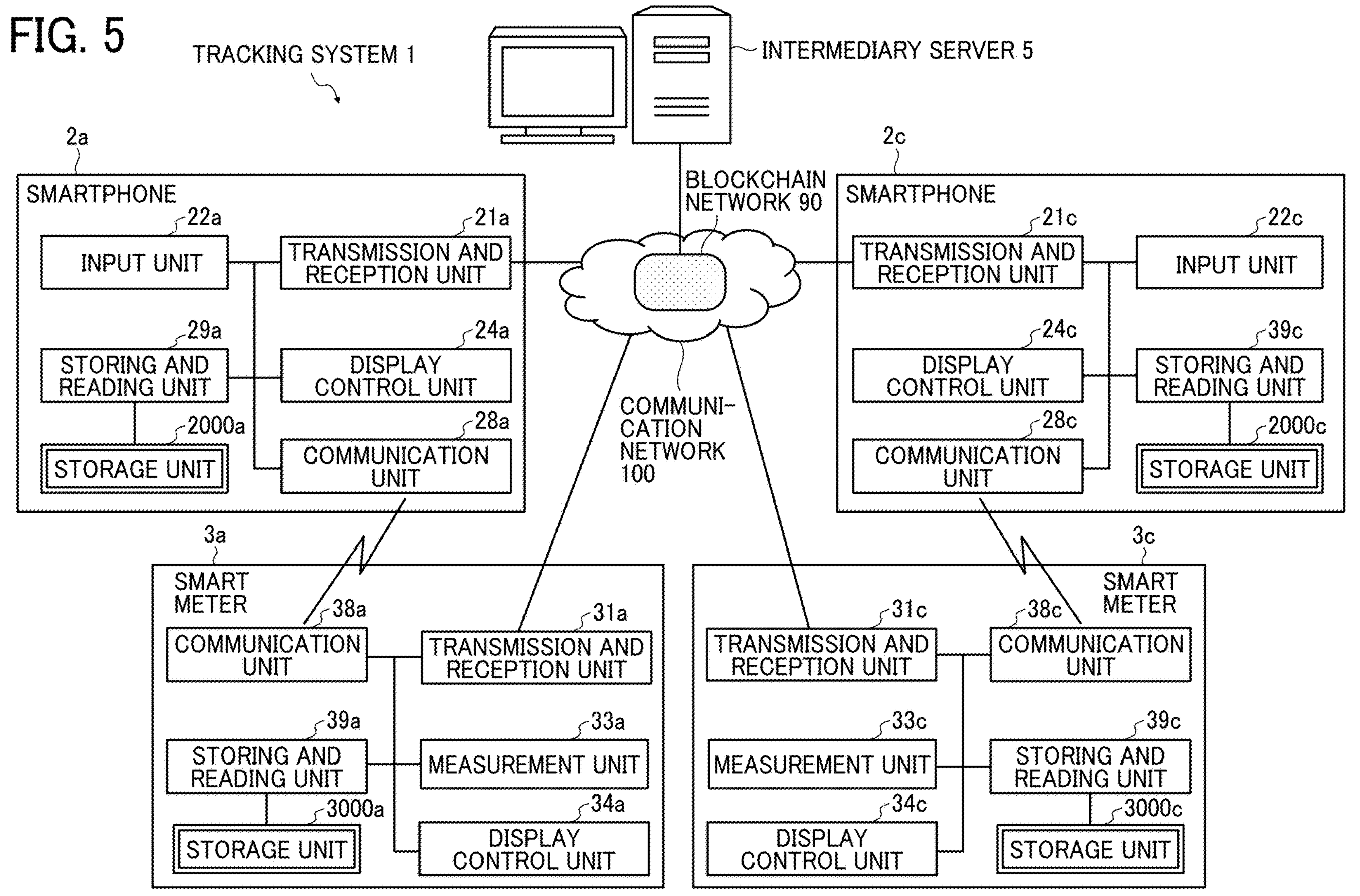
FIG. 5
TRACKING SYSTEM 1
INTERMEDIARY SERVER 5
BLOCKCHAIN NETWORK 90
COMMUNI-CATION NETWORK 100
2a
SMARTPHONE
22a
INPUT UNIT
21a
TRANSMISSION AND RECEPTION UNIT
29a
STORING AND READING UNIT
24a
DISPLAY CONTROL UNIT
2000a
STORAGE UNIT
28a
COMMUNICATION UNIT
2c
SMARTPHONE
21c
TRANSMISSION AND RECEPTION UNIT
22c
INPUT UNIT
24c
DISPLAY CONTROL UNIT
39c
STORING AND READING UNIT
28c
COMMUNICATION UNIT
2000c
STORAGE UNIT
3a
SMART METER
38a
COMMUNICATION UNIT
31a
TRANSMISSION AND RECEPTION UNIT
39a
STORING AND READING UNIT
33a
MEASUREMENT UNIT
3000a
STORAGE UNIT
34a
DISPLAY CONTROL UNIT
3c
SMART METER
31c
TRANSMISSION AND RECEPTION UNIT
38c
COMMUNICATION UNIT
33c
MEASUREMENT UNIT
39c
STORING AND READING UNIT
34c
DISPLAY CONTROL UNIT
3000c
STORAGE UNIT

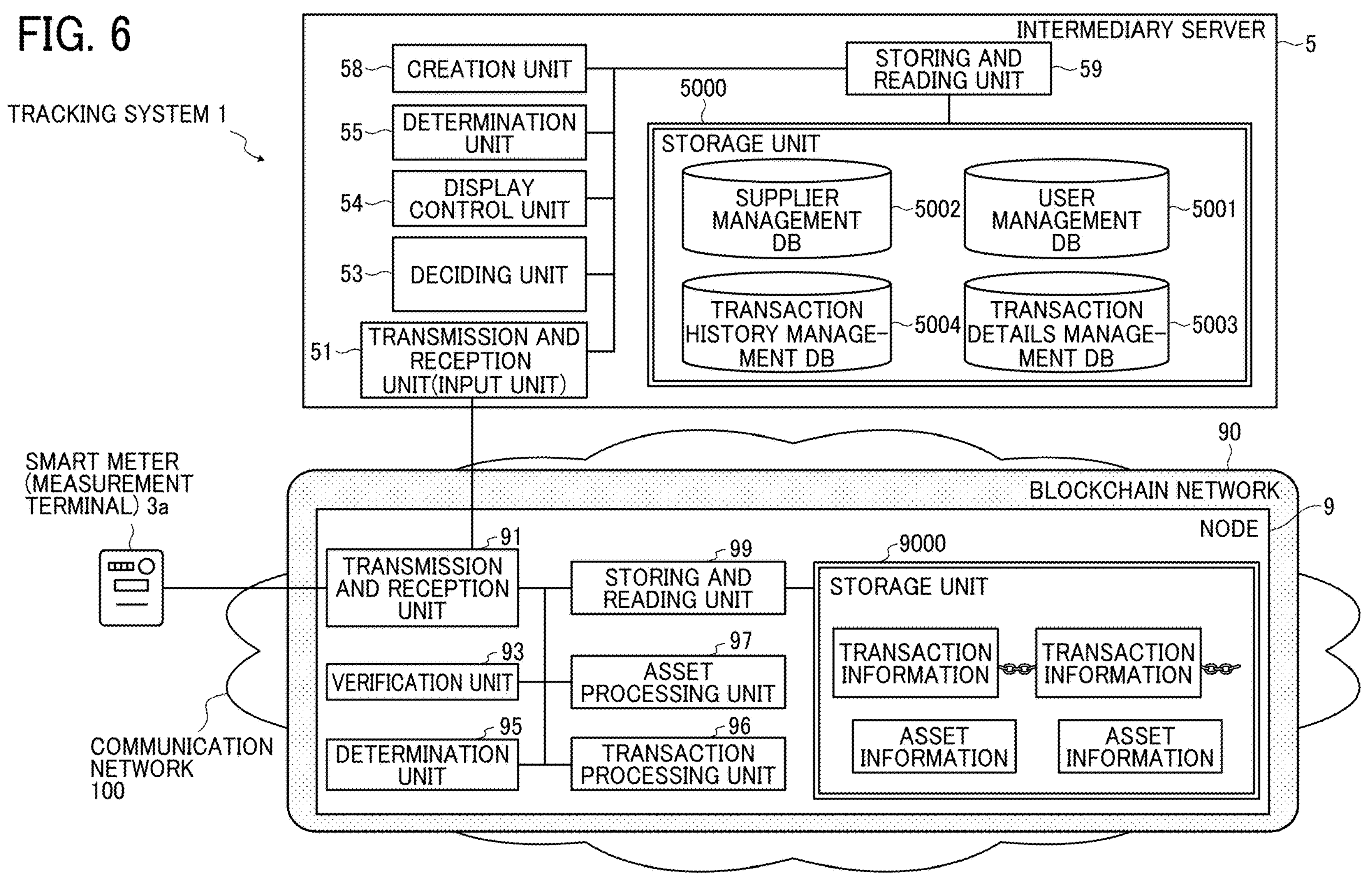
FIG. 6
TRACKING SYSTEM 1
INTERMEDIARY SERVER
5
58
CREATION UNIT
55
DETERMINATION UNIT
54
DISPLAY CONTROL UNIT
53
DECIDING UNIT
51
TRANSMISSION AND RECEPTION UNIT(INPUT UNIT)
STORING AND READING UNIT
59
5000
STORAGE UNIT
SUPPLIER MANAGEMENT DB
5002
USER MANAGEMENT DB
5001
TRANSACTION HISTORY MANAGE-MENT DB
5004
TRANSACTION DETAILS MANAGE-MENT DB
5003
SMART METER (MEASUREMENT TERMINAL) 3a
90
BLOCKCHAIN NETWORK
9
NODE
91
TRANSMISSION AND RECEPTION UNIT
99
STORING AND READING UNIT
9000
STORAGE UNIT
93
VERIFICATION UNIT
97
ASSET PROCESSING UNIT
TRANSACTION INFORMATION
TRANSACTION INFORMATION
95
DETERMINATION UNIT
96
TRANSACTION PROCESSING UNIT
ASSET INFORMATION
ASSET INFORMATION
COMMUNICATION NETWORK 100

FIG. 7A

USER MANAGEMENT TABLE

| USER ID | USER NAME | USER ADDRESS | SELECTABLE SUPPLIER ID |
|---|---|---|---|
| U0001 | CONSUMER Ca | TOKYO··· | P0001, P0002, ··· |
| U0002 | CONSUMER Cb | OSAKA··· | P0001, P0004, ··· |
| ··· | ··· | ··· | ··· |

FIG. 7B

SUPPLIER MANAGEMENT TABLE

| SUPPLIER ID | SUPPLIER NAME | PRODUCTION METHOD TYPE | AVAILABLE AMOUNT (kWh) |
|---|---|---|---|
| P0001 | PRODUCER Aa | SOLAR LIGHT | 100 |
| P0002 | PRODUCER Ab | OIL | 500 |
| ··· | ··· | ··· | ··· |

FIG. 8A

TRANSACTION DETAILS MANAGEMENT TABLE

| USER ID | START DATE | END DATE | PLANNED AMOUNT (kWh) | USAGE RATIO OF RENEWABLE ENERGY (%) | SUPPLIER ID | SUPPLIER NAME | PRODUCTION METHOD TYPE |
|---|---|---|---|---|---|---|---|
| U0001 | 2020.1.1 | 2020.12.31 | 20 | 40 | P0001 | PRODUCER Aa | SOLAR LIGHT |
| | | | | | P0002 | PRODUCER Ab | OIL |
| ... | ... | ... | ... | ... | ... | ... | ... |

FIG. 8B

TRANSACTION HISTORY MANAGEMENT TABLE

USER ID : U0001

| TRANSFER DATE/TIME | TRANSACTION AMOUNT (kWh) | PRODUCTION METHOD TYPE | TOTAL TRANSACTION AMOUNT FOR SOLAR LIGHT (kWh) | TOTAL TRANSACTION AMOUNT FOR OIL (kWh) |
|---|---|---|---|---|
| 2020.1.1 0:00-0:30 | 10 | OIL | | 10 |
| 2020.1.1 0:30-1:00 | 10 | OIL | | 20 |
| ... | ... | ... | ... | ... |
| 2020.1.1 7:30-8:00 | 10 | OIL | | 160 |
| 2020.1.1 8:00-8:30 | 10 | SOLAR LIGHT | 10 | |
| 2020.1.1 8:30-9:00 | 10 | SOLAR LIGHT | 20 | |

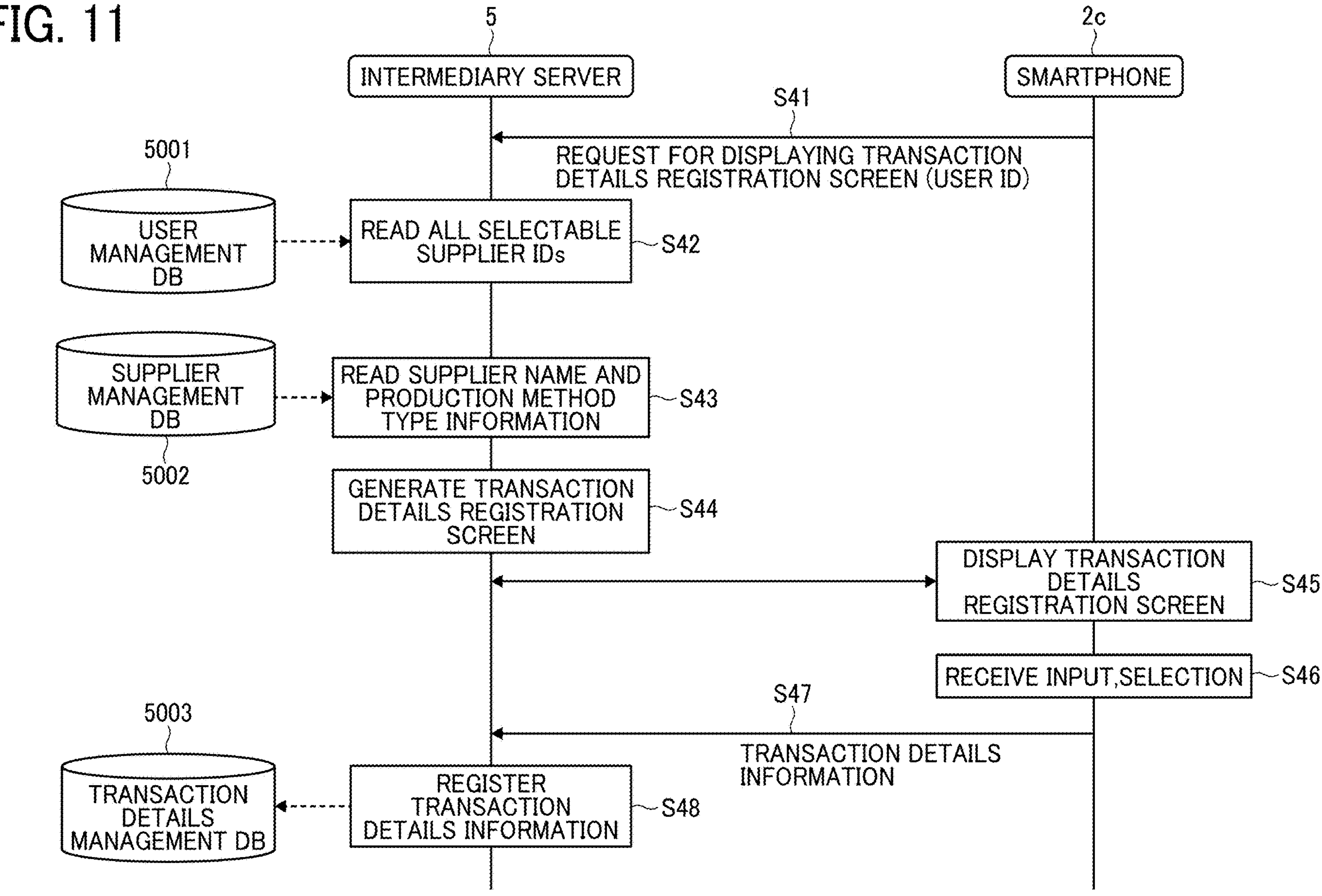
FIG. 11
5
INTERMEDIARY SERVER
2c
SMARTPHONE
S41
REQUEST FOR DISPLAYING TRANSACTION DETAILS REGISTRATION SCREEN (USER ID)
5001
USER MANAGEMENT DB
READ ALL SELECTABLE SUPPLIER IDs
S42
SUPPLIER MANAGEMENT DB
5002
READ SUPPLIER NAME AND PRODUCTION METHOD TYPE INFORMATION
S43
GENERATE TRANSACTION DETAILS REGISTRATION SCREEN
S44
DISPLAY TRANSACTION DETAILS REGISTRATION SCREEN
S45
RECEIVE INPUT,SELECTION
S46
S47
TRANSACTION DETAILS INFORMATION
5003
TRANSACTION DETAILS MANAGEMENT DB
REGISTER TRANSACTION DETAILS INFORMATION
S48

FIG. 14
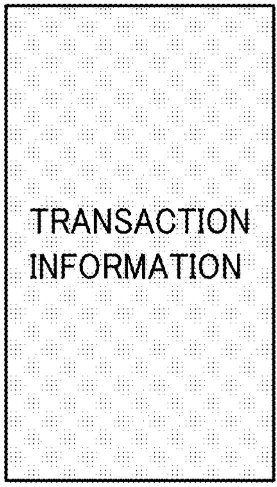
TRANSACTION ID: T0001
TRANSACTION TYPE: GENERATE ASSET INFORMATION
SUPPLIER: PRODUCER Aa
PROVISION DATE/TIME: 2020.1.1 9:00:00
AVAILABLE AMOUNT (kWh): 10
PRODUCTION METHOD: SOLAR LIGHT
OWNER: AGENT Da
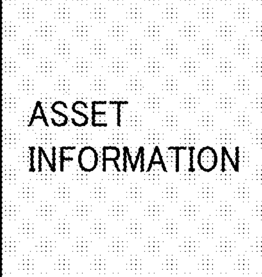
ASSET ID: A0001
SUPPLIER: PRODUCER Aa
PROVISION DATE/TIME: 2020.1.1 9:00:00
AVAILABLE AMOUNT (kWh): 10
PRODUCTION METHOD: SOLAR LIGHT
OWNER: AGENT Da
VALID DATE/TIME: 2020.1.31 23:59
TRANSACTION STATUS: NOT TRANSFERRED

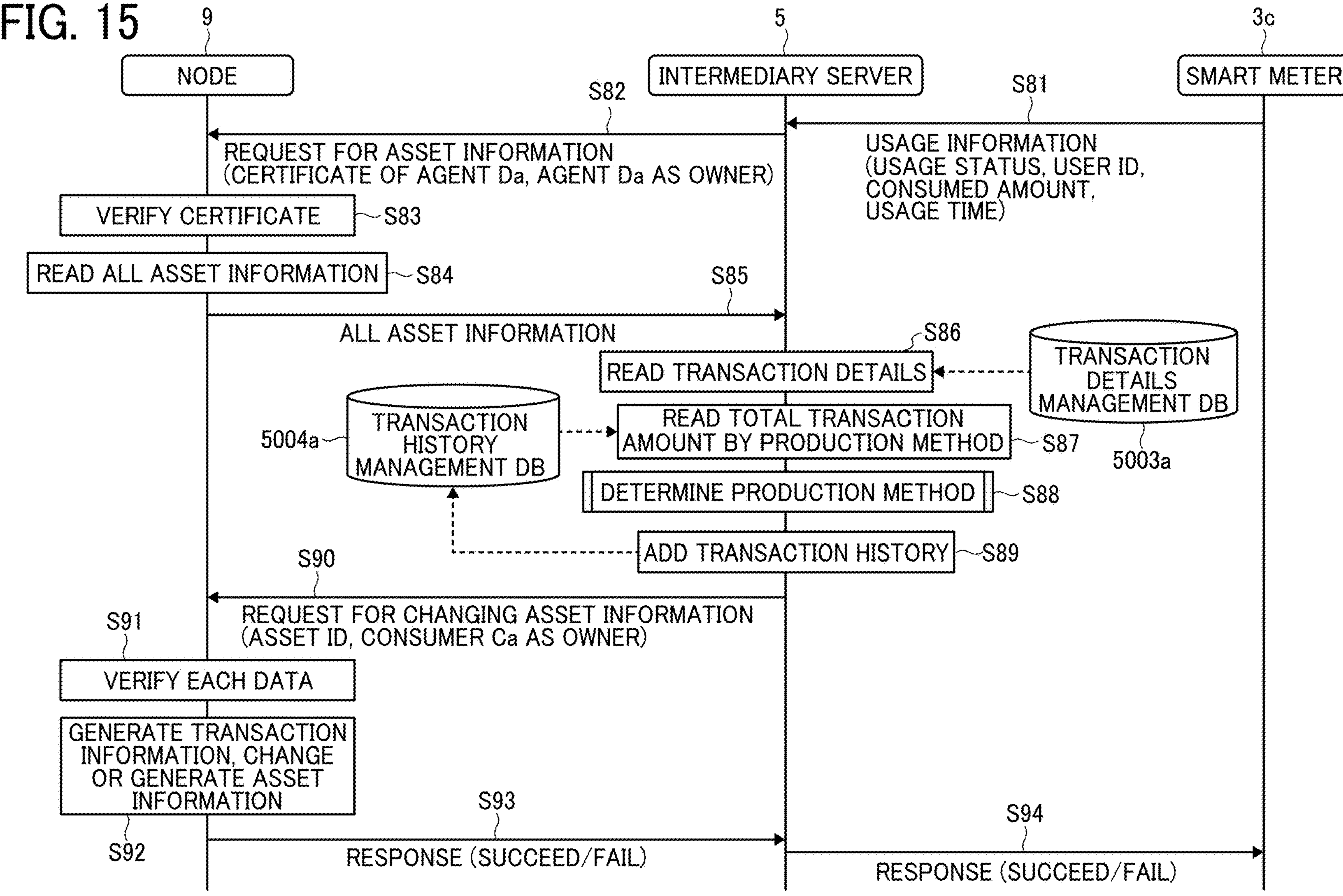
FIG. 15
9
NODE
5
INTERMEDIARY SERVER
3c
SMART METER
S81
USAGE INFORMATION (USAGE STATUS, USER ID, CONSUMED AMOUNT, USAGE TIME)
S82
REQUEST FOR ASSET INFORMATION (CERTIFICATE OF AGENT Da, AGENT Da AS OWNER)
S83
VERIFY CERTIFICATE
S84
READ ALL ASSET INFORMATION
S85
ALL ASSET INFORMATION
S86
READ TRANSACTION DETAILS
TRANSACTION DETAILS MANAGEMENT DB
5003a
S87
READ TOTAL TRANSACTION AMOUNT BY PRODUCTION METHOD
TRANSACTION HISTORY MANAGEMENT DB
5004a
S88
DETERMINE PRODUCTION METHOD
S89
ADD TRANSACTION HISTORY
S90
REQUEST FOR CHANGING ASSET INFORMATION (ASSET ID, CONSUMER Ca AS OWNER)
S91
VERIFY EACH DATA
S92
GENERATE TRANSACTION INFORMATION, CHANGE OR GENERATE ASSET INFORMATION
S93
RESPONSE (SUCCEED/FAIL)
S94
RESPONSE (SUCCEED/FAIL)

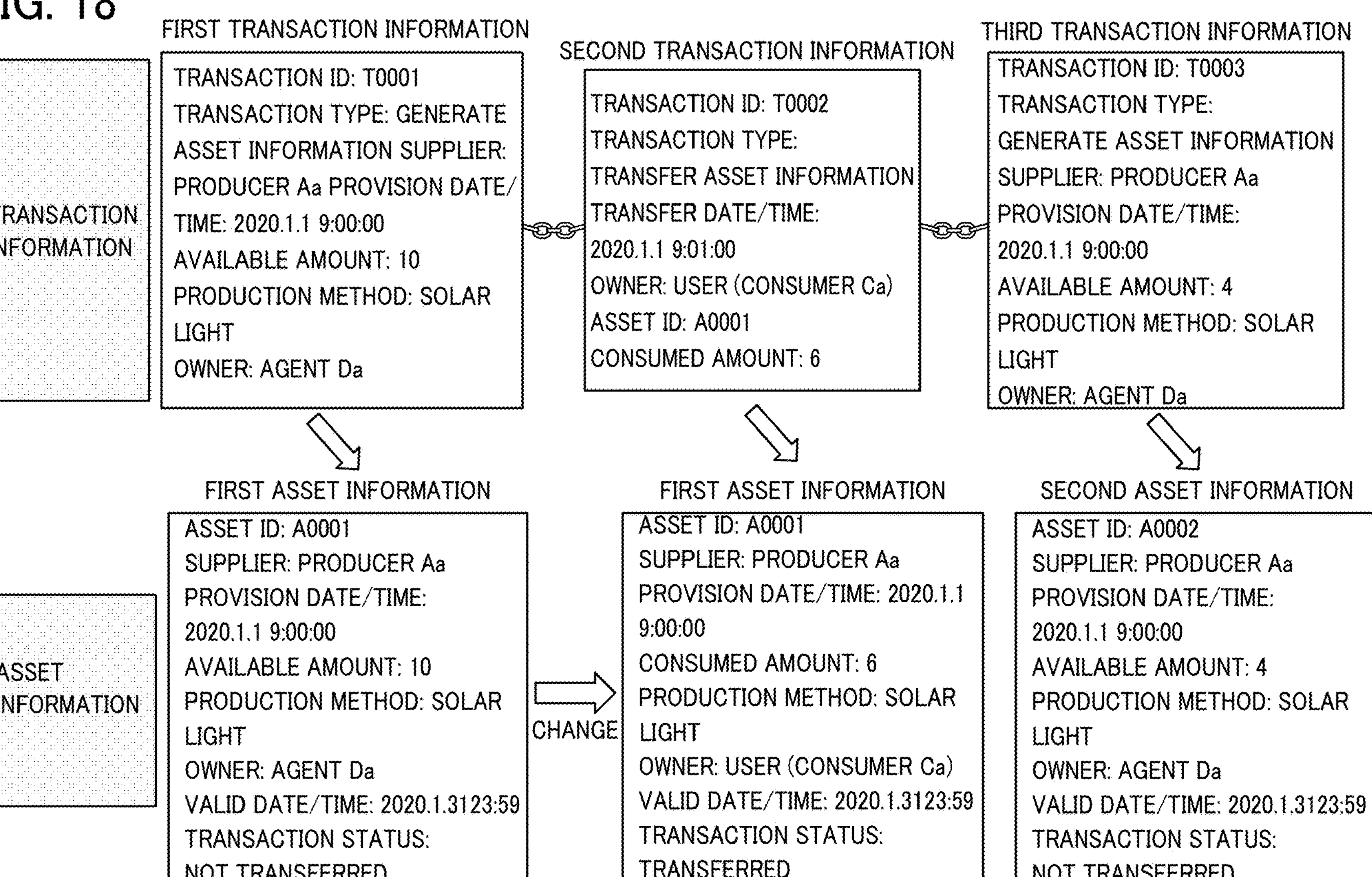
FIG. 18
TRANSACTION INFORMATION
FIRST TRANSACTION INFORMATION
TRANSACTION ID: T0001
TRANSACTION TYPE: GENERATE ASSET INFORMATION SUPPLIER: PRODUCER Aa PROVISION DATE/TIME: 2020.1.1 9:00:00
AVAILABLE AMOUNT: 10
PRODUCTION METHOD: SOLAR LIGHT
OWNER: AGENT Da
SECOND TRANSACTION INFORMATION
TRANSACTION ID: T0002
TRANSACTION TYPE: TRANSFER ASSET INFORMATION
TRANSFER DATE/TIME: 2020.1.1 9:01:00
OWNER: USER (CONSUMER Ca)
ASSET ID: A0001
CONSUMED AMOUNT: 6
THIRD TRANSACTION INFORMATION
TRANSACTION ID: T0003
TRANSACTION TYPE: GENERATE ASSET INFORMATION
SUPPLIER: PRODUCER Aa
PROVISION DATE/TIME: 2020.1.1 9:00:00
AVAILABLE AMOUNT: 4
PRODUCTION METHOD: SOLAR LIGHT
OWNER: AGENT Da
ASSET INFORMATION
FIRST ASSET INFORMATION
ASSET ID: A0001
SUPPLIER: PRODUCER Aa
PROVISION DATE/TIME: 2020.1.1 9:00:00
AVAILABLE AMOUNT: 10
PRODUCTION METHOD: SOLAR LIGHT
OWNER: AGENT Da
VALID DATE/TIME: 2020.1.3123:59
TRANSACTION STATUS: NOT TRANSFERRED
CHANGE
FIRST ASSET INFORMATION
ASSET ID: A0001
SUPPLIER: PRODUCER Aa
PROVISION DATE/TIME: 2020.1.1 9:00:00
CONSUMED AMOUNT: 6
PRODUCTION METHOD: SOLAR LIGHT
OWNER: USER (CONSUMER Ca)
VALID DATE/TIME: 2020.1.3123:59
TRANSACTION STATUS: TRANSFERRED
SECOND ASSET INFORMATION
ASSET ID: A0002
SUPPLIER: PRODUCER Aa
PROVISION DATE/TIME: 2020.1.1 9:00:00
AVAILABLE AMOUNT: 4
PRODUCTION METHOD: SOLAR LIGHT
OWNER: AGENT Da
VALID DATE/TIME: 2020.1.3123:59
TRANSACTION STATUS: NOT TRANSFERRED

FIG. 19

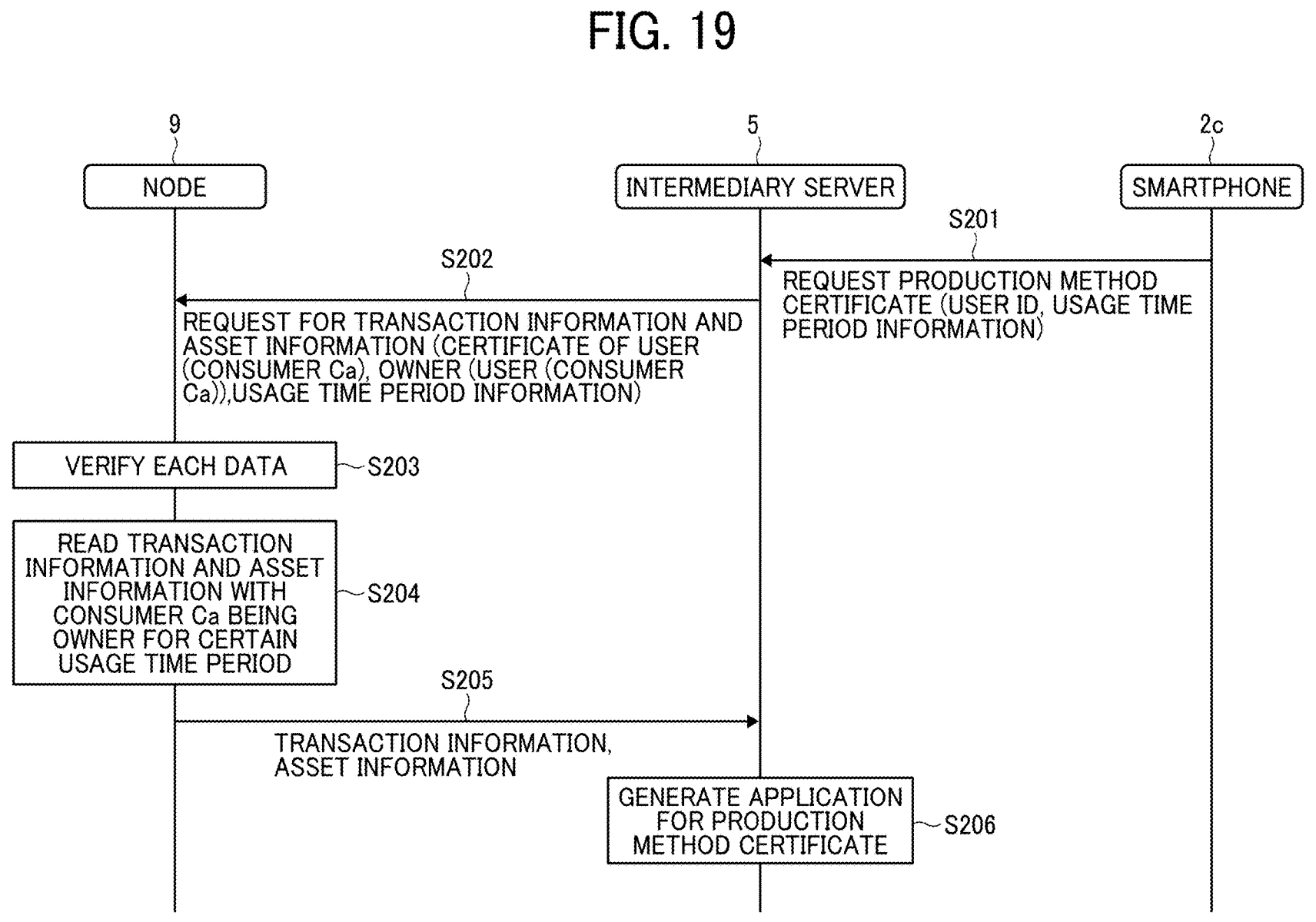

2c SMARTPHONE

5 INTERMEDIARY SERVER

9 NODE

S201 REQUEST PRODUCTION METHOD CERTIFICATE (USER ID, USAGE TIME PERIOD INFORMATION)

S202 REQUEST FOR TRANSACTION INFORMATION AND ASSET INFORMATION (CERTIFICATE OF USER (CONSUMER Ca), OWNER (USER (CONSUMER Ca)),USAGE TIME PERIOD INFORMATION)

S203 VERIFY EACH DATA

S204 READ TRANSACTION INFORMATION AND ASSET INFORMATION WITH CONSUMER Ca BEING OWNER FOR CERTAIN USAGE TIME PERIOD

S205 TRANSACTION INFORMATION, ASSET INFORMATION

S206 GENERATE APPLICATION FOR PRODUCTION METHOD CERTIFICATE

INTERMEDIARY SERVER, SYSTEM, INTERMEDIATING METHOD, AND NON-TRANSITORY RECORDING MEDIUM

CROSS-REFERENCE TO RELATED APPLICATIONS

This patent application is a continuation application of International Application No. PCT/JP2021/008688, filed on Mar. 5, 2021, which claims priority to Japanese Patent Application Nos. 2020-049892, filed on Mar. 19, 2020, 2020-088549, filed on May 21, 2020, 2021-017111, filed on Feb. 5, 2021, in the Japan Patent Office, the entire disclosure of which is hereby incorporated by reference herein.

BACKGROUND

Technical Field

The present invention relates to an intermediary server, a system, an intermediating method, and a non-transitory recording medium.

Related Art

In recent years, electricity produced from renewable energy has been attracting attention. In this disclosure, the electricity produced from renewable energy is electricity produced from a subset of renewable resources such as solar (solar light or solar heat), wind power, biomass, geothermal power, hydropower, and heat in the atmosphere. Compared to the case where the fossil fuel such as oil, coal, and liquefied natural gas is used to produce electricity, production of electricity using renewable energy emits almost no $CO_2$, which is a cause for global warming. That is, renewable energy is an energy resource that is environmentally friendly, from among various energy resources used for producing electricity today. By operating such as factories using the above-described power based on renewable energy, which is environmentally friendly, companies can increase brand credibility.

There is a method for using a decentralized ledger system, such as a blockchain technology, to manage transfer of electricity. Further, in order to encourage stable consumption of electricity, it is desirable to adjust the consumed electricity and the produced electricity in real time to make them equal.

However, it takes a certain amount of time to confirm consistency of each ledger information via the network. Therefore, it has not been suitable to apply the blockchain technology to track use of electricity, which requires responsiveness in realtime.

SUMMARY

In one exemplary embodiment, an intermediary server for intermediating transfer of ownership of energy between a supplier and a user, includes circuitry that receives usage information indicating that energy has been used from a communication terminal of the user, and transmits, to a decentralized ledger system, a request for changing ownership of the energy from the previous owner to the user based on the usage information.

In one exemplary embodiment, a tracking system includes the above-described intermediary server, and a communication terminal of the user.

In one exemplary embodiment, a method for intermediating transfer of ownership of energy between a supplier and a user, includes: receiving usage information indicating that energy has been used from a communication terminal of the user; and transmitting, to a decentralized ledger system, a request for changing ownership of the energy from the previous owner to the user based on the usage information.

In one exemplary embodiment, a non-transitory recording medium storing a plurality of instructions which, when executed by one or more processors, cause the processors to perform the above-described method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 1 is a schematic view illustrating a tracking system according to an exemplary embodiment;

FIG. 3 is a schematic diagram illustrating a hardware configuration of a smart meter according to the exemplary embodiment;

FIG. 5 is a schematic block diagram illustrating functional configurations of the smartphone and the smart meter in the tracking system of FIG. 1, according to the exemplary embodiment;

FIG. 6 is a schematic block diagram illustrating a functional configuration of the intermediary server and the node in the tracking system of FIG. 1, according to the exemplary embodiment;

FIG. 7A is a conceptual diagram illustrating an example of user management table;

FIG. 7B is a conceptual diagram illustrating an example of supplier management table;

FIG. 8A is a conceptual diagram illustrating an example of transaction details management table;

FIG. 8B is a conceptual diagram illustrating an example of transaction history management table;

FIG. 11 is a sequence diagram illustrating processing of registering transaction details of asset, according to the exemplary embodiment;

FIG. 12A is an illustration of an example transaction details registration screen before information is entered or selected;

FIG. 12B is an illustration of an example transaction details registration screen after information is entered or selected;

FIG. 14 is a conceptual diagram illustrating transaction information and asset information, according to the exemplary embodiment;

FIG. 15 is a sequence diagram illustrating processing of setting the user as an owner of the asset for which transfer is intermediated by the intermediary agent, according to the exemplary embodiment;

FIG. 18 is a conceptual diagram illustrating transaction information and asset information, when usage amount of electricity is less than available amount, according to the exemplary embodiment; and FIG. 19 is a sequence diagram illustrating processing of facilitating a production method certificate of an asset, according to the exemplary embodiment.

Figure 2:
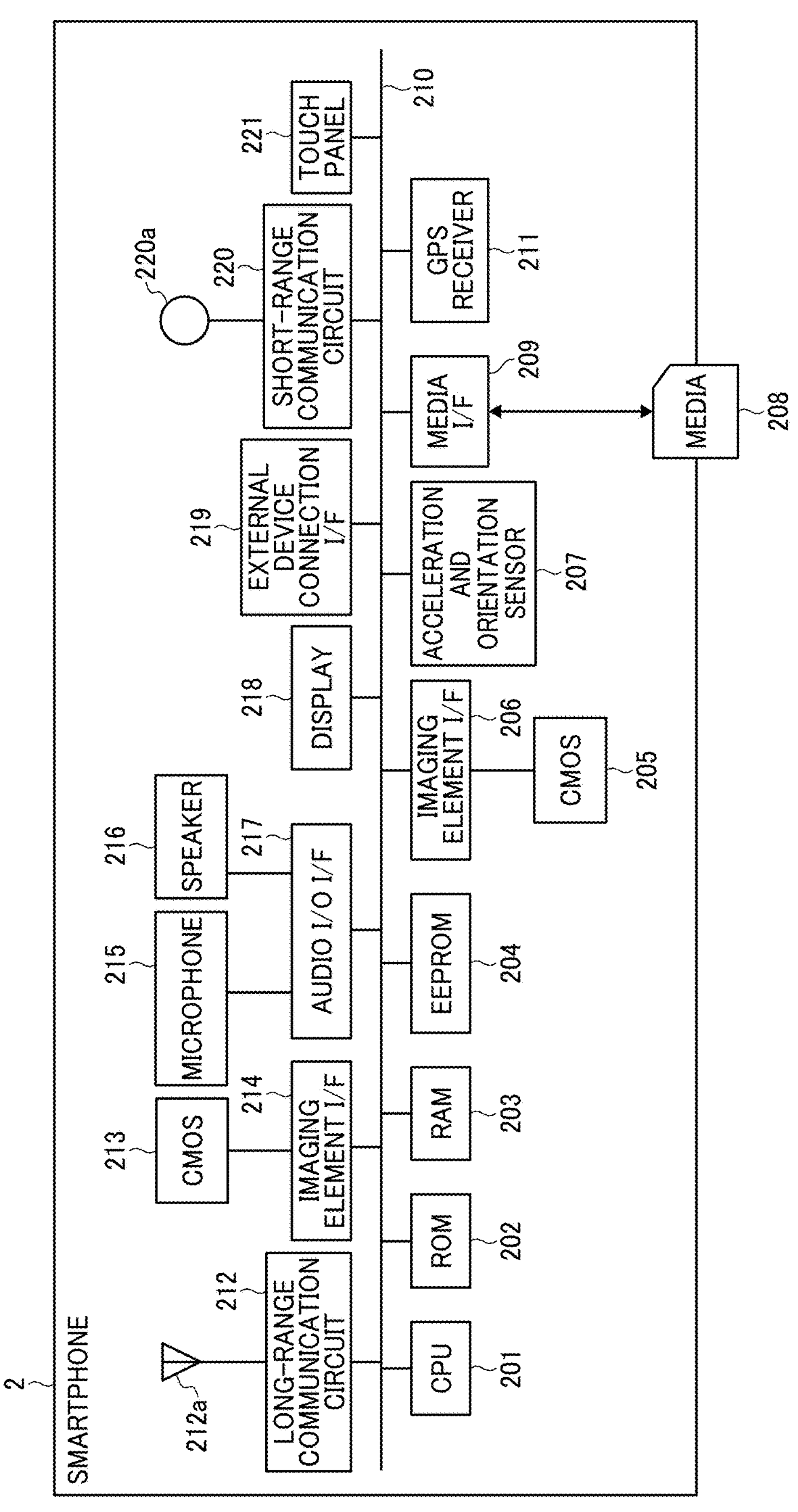
FIG. 2 is a schematic diagram illustrating a hardware configuration of a smartphone according to the exemplary embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described in detail below, with reference to the drawings.

Overview of System Configuration

First, overview of a configuration of a tracking system 1 is described according to one or more exemplary embodiments. FIG. 1 is a schematic view of an example of the tracking system according to the present embodiment. In this disclosure, the case in which electricity, which is an example of energy, is used as an example of an asset is described. In this disclosure, the asset is an item that has value. The ownership of the asset and the production method of the asset are managed using asset information described later. The asset information is information on the asset, such as an ownership of the asset. Since the electricity, as an example of energy, is used as the asset in this example, the asset information may be referred to as energy information. Further, as described below, the transaction information is generated to generate or change the asset information. Since the transaction information is used to track ownership of the asset, the transaction information may be referred to as tracking information.

Explanation on Each Entity

As illustrated in FIG. 1, the tracking system 1 is used by a producer Aa of electricity, a producer Ab of electricity, a consumer Ca of electricity, an intermediary agent Da, and a certification authority E.

Producer Aa, an example of a supplier, is an entity that produces electricity from solar light, as one example of an entity that produces electricity from renewable energy resource (referred to as "green power").

Producer Ab, an example of a supplier, is an entity that produces electricity from oil as an example of fossil fuel. The supplier may be a union that purchases assets (items) from each producer and resells the assets (items).

The consumer Ca, an example of a user, is an entity that consumes electricity supplied from the producer Aa or Ab. In case the asset is not consumed like electricity, such as in the case of a real estate property, the user may be an owner who currently owns the asset.

The intermediary agent Da is an entity that intermediates transfer of ownership of electricity between different entities.

The certification authority E is a public institution such as a national or local public entity that certifies a certain type of electricity production method. Electricity production methods can be determined based on, for example, a type of energy resource used to produce electricity. Assuming that the electricity production method is defined by a type of energy resource, examples of electricity production method include a production method using solar (such as solar light or solar heat), a production method using wind (such as wind power), a production method using biomass, a production method using geothermal power, a production method using hydroelectric resources, a production method using heat in the atmosphere, and a production method using nuclear power. Of those various types of electricity production methods, the electricity production methods using renewable energy resources, such as solar light, solar heat, wind power, biomass, geothermal power, hydropower, and heat in the atmosphere are grouped into a production method using renewable energy. The electricity production methods using petroleum, coal, and liquefied natural gas are grouped into a production method using conventional energy such as fossil fuel. Compared to the production method using conventional energy, the production method using renewable energy emits almost no $CO_2$, which is a cause for global warming. That is, renewable energy is an energy resource that is environmentally friendly. In this disclosure, as examples of renewable energy resource, solar light or heat, wind power, biomass, geothermal power, hydropower, and heat in the atmosphere are referred, for the descriptive purposes. Further, as examples of conventional energy resource, fossil fuel, such as oil, coal, and liquefied natural gas are referred, for the descriptive purposes.

The intermediary agent Da intermediates processing on behalf of the customer Ca. Specifically, the intermediary agent Da sends an application form to the certification authority E by mail or the like, receives a production method certificate from the certification authority E, and sends the production method certificate to the consumer Ca by mail or the like. The production method certificate, for example, describes a usage ratio of renewable energy. With the production method certificate, the consumer Ca can apply for public subsidy, based on the renewable energy usage ratio (or $CO_2$ reduction rate) of the consumer Ca, or total usage of renewable energy of the consumer Ca.

The number of producers may be one or three or more. There may be multiple consumers or intermediary agents.

Power Grid Network

The substation Bx is a substation nearest to the producers Aa and Ab. The substation By is a substation nearest to the consumer Ca. The power grid network 10 includes substations Bx and By, transmission lines, and distribution lines, etc. The electricity supplied from the producers Aa and Ab is distributed to the consumer Ca via the power grid network 10.

Data Communication Network

The producer Aa is equipped with a smartphone 2*a*, a smart meter 3*a*, and a power generator 4*a*. The producer Ab is equipped with a smartphone 2*b*, a smart meter 3*b*, and a power generator 4*b*. The consumer Ca is equipped with a smartphone 2*c*, a smart meter 3*c*, and an electric device 8. The intermediary agent Da manages an intermediary server 5. The intermediary agent Da may be an organization such as a corporation or an individual (for example, a president, an executive officer, or an employee such as an information technology (IT) system administrator).

The number of smartphones may be two or four or more, depending on the number of producers and consumers. Hereinafter, the smartphones 2*a*, 2*b*, and 2*c* may be collectively referred to as the smartphone 2. Further, the number of smart meters may be two or four or more, depending on the number of producers and consumers. Hereinafter, the smart meters 3*a*, 3*b*, and 3*c* may be collectively referred to as the smart meter 3. The number of power generators 4*a* and 4*b* may be one or three or more, depending on the number of producers. Hereinafter, the power generators 4*a* and 4*b* may be collectively referred to as the power generator 4.

The number of intermediary servers 5 may be two or more, for example, depending on the number of intermediary agents. Further, the intermediary server 5 may be implemented by a single computer or a plurality of computers. The number of electric devices 8 may be two or more, depending on the number of consumers.

As illustrated in FIG. 1, the tracking system 1 that resides on a data communication network includes the plurality of smartphones 2*a*, 2*b*, and 2*c*, the plurality of smart meters 3*a*, 3*b*, and 3*c*, the plurality of power generators 4*a* and 4*b*, the intermediary server 5, and a plurality of nodes 9*a*, 9*b*, 9*c*, and 9*d* each implemented by such as a computer. Further, the nodes 9*a*, 9*b*, 9*c*, and 9*d* form a blockchain network 90. The blockchain network 90 is formed on the communication network 100 such as the Internet. The communication network 100 includes the Internet, a mobile communication network, a local area network (LAN), and the like. The communication network 100 may include not only wired communication network but also wireless communication network such as mobile communication system (4G, 5G, 6G, etc.) and Worldwide Interoperability for Microwave Access (WiMAX). Although there are actually a large number of nodes exist, only four nodes 9*a*, 9*b*, 9*c*, and 9*d* are illustrated in the figure for simplicity. The nodes 9*a*, 9*b*, 9*c*, and 9*d* are managed by such as different companies. The intermediary agent Da may be any one of these different companies. Hereinafter, the nodes 9*a*, 9*b*, 9*c*, and 9*d* may be collectively referred to as the node 9.

Next, the terminals and devices of the producers Aa and Ab and the consumer Ca are described.

Terminal and Devices of Producer Aa

The smartphone 2*a* communicates data with the smart meter 3*a* by short-range wireless technology such as Near Field Communication (NFC) or BLUETOOTH. Further, the smartphone 2*a* communicates data with the intermediary server 5 via the communication network 100.

The smart meter 3*a* communicates data with the intermediary server 5 via the communication network 100. Further, the smart meter 3*a* measures an amount of electricity produced by the power generator 4*a* every predetermined time period (for example, every 30 minutes). The smart meter 3*a* performs processing such as requesting the node 9 of the blockchain network 90 to generate asset information indicating the amount of asset that can be provided such as electric power and the ownership of such asset.

The power generator 4*a* is a device that generates electricity from solar light.

Terminals and Devices of Producer Ab

The smartphone 2*b* communicates data with the smart meter 3*b* by short-range wireless technology such as Near Field Communication (NFC) or BLUETOOTH. Further, the smartphone 2*b* communicates data with the intermediary server 5 via the communication network 100.

The smart meter 3*b* communicates data with the intermediary server 5 via the communication network 100. Further, the smart meter 3*b* measures an amount of electricity produced by the power generator 4*b* every predetermined time period (for example, every 30 minutes). The smart meter 3*b* performs processing such as requesting the node 9 of the blockchain network 90 to generate asset information indicating the amount of asset that can be provided such as electric power and the ownership of such asset.

The power generator 4*b* is a device that generates electricity from oil.

Terminals and Devices of Consumer Ca

The smartphone 2*c* communicates data with the smart meter 3*c* by short-range wireless technology such as Near Field Communication (NFC) or BLUETOOTH. Further, the smartphone 2*c* communicates data with the intermediary server 5 via the communication network 100.

The smart meter 3*c* communicates data with the intermediary server 5 via the communication network 100. Further, the smart meter 3*c* measures an amount of electricity consumed by the electric device 8 every predetermined time period (for example, every 30 minutes). The smart meter 3*c* performs processing such as transmitting usage information indicating the amount of electricity consumed, and a duration of time when electricity is consumed, etc., to the intermediary server 5 via the communication network 100. In the present embodiment, since the intermediary server 5 accesses the blockchain network 90 on behalf of the smart meter 3*c*, the smart meter 3*c* does not need to directly access the blockchain network 90. To access the blockchain network 90 on behalf of the smart meter 3*c*, the intermediary server 5 previously stores, in the storage unit 5000, a certificate of the consumer Ca that is required to access the blockchain network 90.

The electric device 8 is any device that is operated with electricity supplied by the consumer Aa and/or Ab.

Intermediary Server of Intermediary Agent Da

The intermediary server 5 intermediates transaction of asset, such as ownership of asset such as electricity, between a supplier of asset and a user of asset. Specifically, the intermediary agent intermediates ownership of asset between the supplier and the user. In this disclosure, the example case in which the asset, which is an item, is electricity is described. To faciliate transaction of asset, the intermediary server 5 communicates data with each smartphone 2 (as the user) and each smart meter 3 (as the supplier) via the communication network 100. Further, the intermediary server 5 accesses the node 9 of the blockchain network 90 to communicate data with the node 9. In the example case of asset being electricity, the tracking system 1 tracks electricity from the supplier to the user.

The smartphones 2*a* and 2*b* are examples of registered terminals of the suppliers. The smartphone 2*c* is an example of a registered terminal of the user. Examples of registered terminal also include smart watches, PCs, and smart glasses. The smart meter 3 is an example of a measurement terminal or an example of a communication terminal.

Hardware Configuration

Figure 4:
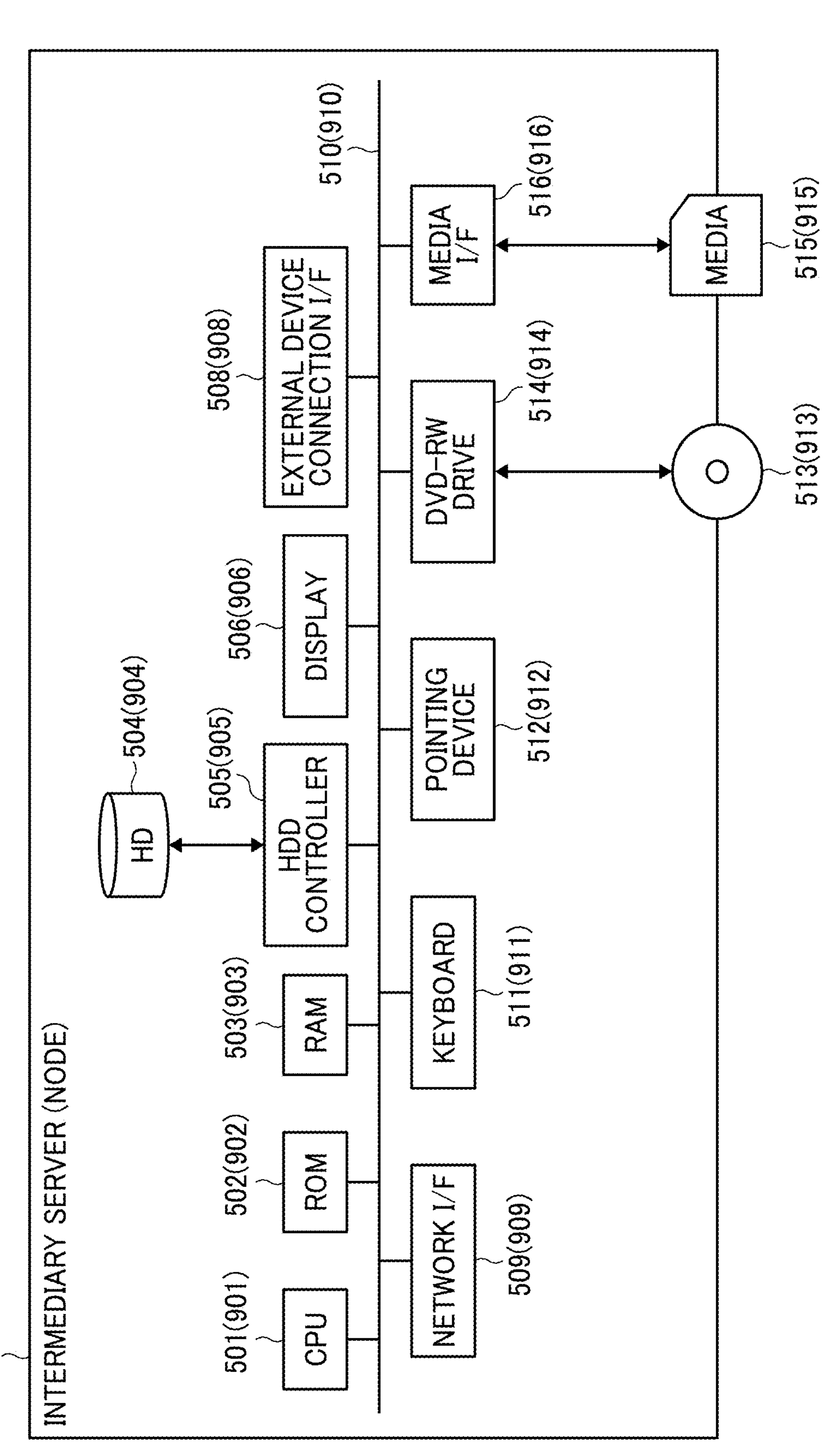
FIG. 4 is a schematic diagram illustrating a hardware configuration of an intermediary server according to the exemplary embodiment.

Next, referring to FIGS. 2 to 4, hardware configurations of the smartphone 2, the smart meter 3, the intermediary server 5, and the node 9 are described according to the embodiment.

Hardware Configuration of Smartphone

FIG. 2 is a diagram illustrating a hardware configuration of a smartphone according to the exemplary embodiment. As illustrated in FIG. 2, the smartphone 2 includes a central processing unit (CPU) 201, read only memory (ROM) 202, random access memory (RAM) 203, Electrically Erasable Programmable ROM (EEPROM) 204, Complementary Metal Oxide Semiconductor (CMOS) sensor 205, imaging element interface (I/F) 206, acceleration and orientation sensor 207, media I/F 209, and Global Positioning System (GPS) receiver 211.

Of these, the CPU 201 controls entire operation of the smartphone 2. The ROM 202 stores a program for executing the CPU 201, such as an initial program loader (IPL). The RAM 203 is used as a work area for the CPU 201. The EEPROM 204 reads or writes various data such as a program for a smartphone under control of the CPU 201. The CMOS (Complementary Metal Oxide Semiconductor) sensor 205 is an example of a built-in imaging means that captures an object (mainly, a self-image of a user) under control of the CPU 201 to obtain image data. In alternative to the CMOS sensor 205, an imaging element such as a CCD (charge-coupled device) sensor can be used. The imaging element I/F 206 is a circuit that controls driving of the CMOS sensor 205. The acceleration and orientation sensor 207 includes various sensors such as an electromagnetic compass or gyrocompass for detecting geomagnetism and an acceleration sensor. The media I/F 209 controls reading and writing (storing) of data from and to a storage medium 208 such as a flash memory. The GPS receiver 211 receives a GPS signal from a GPS satellite.

The smartphone 2 further includes a long-range communication circuit 212, a CMOS sensor 213, an imaging element I/F 214, a microphone 215, a speaker 216, an audio input/output I/F 217, a display 218, an external device connection I/F (Interface) 219, a short-range communication circuit 220, an antenna 220*a* for the short-range communication circuit 220, and a touch panel 221.

Of these, the long-range communication circuit 212 is a circuit that communicates with other device through the communication network 100. The CMOS sensor 213 is an example of built-in imaging device that captures an object under control of the CPU 201 to obtain image data. The imaging element I/F 214 is a circuit that controls driving of the CMOS sensor 213. The microphone 215 is a built-in circuit that converts audio into an electric signal. The speaker 216 is a built-in circuit that generates audio such as music or voice by converting an electric signal into physical vibration. The audio input/output I/F 217 is a circuit for inputting or outputting an audio signal between the microphone 215 and the speaker 216 under control of the CPU 201. The display 218 is an example of display device that displays an image of the object, various icons, etc. Examples of the display 218 include a liquid crystal display (LCD) and an organic electroluminescence (EL) display. The external device connection I/F 219 is an interface for connecting to various external devices. The short-range communication circuit 220 is a communication circuit that communicates in compliance with the NFC (near field communication), the BLUETOOTH (Registered Trademark), and the like. The touch panel 221 is an example of input means that allows a user to operate the smartphone 2 by touching the display 218.

The smartphone 2 further includes a bus line 210. The bus line 210 is an address bus or a data bus, which electrically connects the components illustrated in FIG. 2 such as the CPU 201.

Hardware Configuration of Smart Meter

FIG. 3 is a diagram illustrating an example of hardware configuration of the smart meter according to the embodiment. As illustrated in FIG. 3, the smart meter 3 is provided with a computer. The smart meter 3 includes a CPU 301, ROM 302, RAM 303, NVRAM 304, display 306, measurement sensor 307, switch 308, network I/F 309, keypad 311, short-range communication circuit 320, and antenna 320*a* for the short-range communication circuit 320.

The CPU 301 controls entire operation of the smart meter 3. The ROM 302 stores a program for executing the CPU 301 such as an IPL. The RAM 303 is used as a work area for the CPU 301. The NVRAM (Non-Volatile RAM) 304 is a non-volatile memory that stores and reads various data such as the program. The display 306 displays various information such as cursors, menus, windows, characters, or images.

The measurement sensor 307 measures electricity provided or consumed by the smart meter 3. The switch 308 is turned on to close, or turned off to open, the connections in an electric circuit to cause the electric current flow or stop in the electric circuit.

The network I/F 309 is an interface for communicating data via the communication network 100 including the blockchain network 90 such as the Internet. The keypad 311 is an example of input device provided with a plurality of keys for inputting or selecting characters, numerals, or various instructions. The short-range communication circuit 320 is a communication circuit that enables communication based on short-range wireless technology such as NFC and BLUETOOTH. The bus line 310 is an address bus or a data bus, which electrically connects the components illustrated in FIG. 3 such as the CPU 301.

Hardware Configuration of Intermediary Server

FIG. 4 is a diagram illustrating a hardware configuration of the intermediary server. Hardware components of the intermediary server 5 are designated by reference numerals in 500 series. As illustrated in FIG. 4, the intermediary server 5 is implemented by a computer. Specifically, the intermediary server 5 of FIG. 4 includes a CPU 501, ROM 502, RAM 503, hard disk (HD) 504, hard disk drive (HDD) controller 505, display 506, external device connection I/F 508, network I/F 509, bus line 510, keyboard 511, pointing device 512, Digital Versatile Disk Rewritable (DVD-RW) drive 514, and media I/F 516.

The CPU 501 controls entire operation of the intermediary server 5. The ROM 502 stores a control program for executing the CPU 501, such as an IPL. The RAM 503 is used as a work area for the CPU 501.

The HD 504 stores various data such as the program. The HDD controller 505 controls reading or writing of various data with respect to the HD 504 under control of the CPU 501. The display 506 displays various information such as cursors, menus, windows, characters, or images. The external device connection I/F 508 is an interface that connects to various external devices. Examples of the external devices include, but not limited to, a universal serial bus (USB) memory and a printer. The network I/F 509 is an interface that controls communication of data through the communication network 100. The bus line 510 is an address bus, a data bus or the like, which electrically connects the elements illustrated in FIG. 4 such as the CPU 501.

The keyboard 511 is one example of input device provided with a plurality of keys for allowing a user to input characters, numerals, or various instructions. The pointing device 512 is an example of input device that allows a user to select or execute various instructions, select a target for processing, or move a cursor. The DVD-RW drive 514 reads and writes various data from and to a DVD-RW 513, which is an example of a removable storage medium. The removable storage medium is not limited to the DVD-RW and may be a digital versatile disc-recordable (DVD-R) or Blu-ray Disc. The media I/F 516 controls reading and writing (storing) of data from and to a recording medium 515 such as a flash memory.

Hardware Configuration of Node

FIG. 4 is a diagram illustrating an example of hardware configuration of the node. Hardware components of the node 9 are designated by reference numerals in 900 series. As illustrated in FIG. 4, the node 9 is implemented by a computer. As illustrated in FIG. 4, since the node 9 has the same configuration as the intermediary server 5, description of hardware configuration thereof is omitted.

Functional Configuration

Next, referring to FIGS. 5 to 8, a functional configuration of each terminal and device of the tracking system 1 is described. FIG. 5 is a block diagram illustrating a functional configuration of the smartphone and the smart meter in the tracking system.

Functional Configuration of Smartphone 2*a*

As illustrated in FIG. 5, the smartphone 2*a* includes a transmission and reception unit 21*a*, an input unit 22*a*, a display control unit 24*a*, a communication unit 28*a*, and a storing and reading unit 29*a*. These units are functions or means implemented by or caused to function by operating one or more hardware components illustrated in FIG. 2 in cooperation with instructions of the CPU 201 according to the program for smartphone loaded from the EEPROM 204 to the RAM 203.

Further, the smartphone 2*a* includes a storage unit 2000*a* implemented by the ROM 202, the RAM 203, and the EEPROM 204 illustrated in FIG. 2.

Each Functional Element of Smartphone 2*a*

The transmission and reception unit 21*a* of the smartphone 2*a*, which is implemented mainly by instructions of the CPU 201 with respect to the long-range communication circuit 212, controls transmission or reception of various data (or information) to or from other device (for example, the intermediary server 5) via the communication network 100.

The input unit 22*a*, which is mainly implemented by instructions of the CPU 201 with respect to the touch panel 221, receives various selections or inputs from the user.

The display control unit 24*a*, which is mainly implemented by instructions of the CPU 201, controls the display 218 to display various images. The display control unit 24*a* further provides a web browser function.

The communication unit 28*a*, which is mainly implemented by instructions of the CPU 201 with respect to the short-range communication circuit 220, communicates various data with a communication unit 38*a*, to be described later, of the smart meter 3*a*. In the case of wired communication, the smartphone 2*a* is connected to the smart meter 3*a* via a communication cable to communicate data with other device.

The storing and reading unit 29*a*, which is mainly implemented by instructions of the CPU 201, stores various data (or information) in the storage unit 2000*a* and reads various data (or information) from the storage unit 2000*a*.

Functional Configuration of Smartphone 2*c*

As illustrated in FIG. 5, the smartphone 2*c* includes a transmission and reception unit 21*c*, an input unit 22*c*, a display control unit 24*c*, a communication unit 28*c*, and a storing and reading unit 29*c*. These units are caused to function by operating one or more hardware components illustrated in FIG. 2 in cooperation with instructions of the CPU 201 according to the program for smartphone loaded from the EEPROM 204 to the RAM 203.

Further, the smartphone 2*c* includes a storage unit 2000*c* implemented by the ROM 202, the RAM 203, and the EEPROM 204 illustrated in FIG. 2.

The respective units of the smartphone 2*c* (transmission and reception unit 21*c*, input unit 22*c*, display control unit 24*c*, communication unit 28*c*, and storing and reading unit 29*c*) are substantially the same in function to corresponding units of the smartphone 2*a* (transmission and reception unit 21*a*, input unit 22*a*, display control unit 24*a*, communication unit 28*a*, and storing and reading unit 29*a*), so that description thereof is omitted.

Similarly to the smartphone 2*c*, the smartphone 2*b* is substantially the same in function to the smartphone 2*a*, but FIG. 5 omits the smartphone 2*b* as the smartphone 2*b* is not referred below.

Functional Configuration of Smart Meter 3*a*

As illustrated in FIG. 5, the smart meter 3*a* includes a transmission and reception unit 31*a*, a measurement unit 33*a*, a display control unit 34*a*, a communication unit 38*a*, and a storing and reading unit 39*a*. These units are caused to function by operating one or more hardware components illustrated in FIG. 3 in cooperation with instructions of the CPU 301 according to the program for smart meter loaded from the NVRAM 304 to the RAM 303.

Further, the smart meter 3*a* includes a storage unit 3000*a* implemented by the ROM 302, the RAM 303, and the NVRAM 304 illustrated in FIG. 3.

Each Functional Unit of Smart Meter 3*a*

The transmission and reception unit 31*a* of the smart meter 3*a*, which is implemented mainly by instructions of the CPU 301 with respect to the network I/F 309, controls transmission or reception of various data (or information) to or from other device (for example, the intermediary server 5) via the communication network 100.

The measurement unit 33*a*, which is implemented mainly by instructions of the CPU 301 with respect to the measurement sensor 307, measures the amount of electricity generated by the power generator 4*a*.

The display control unit 34*a*, which is mainly implemented by the instructions of the CPU 301, controls the display 306 to display various images.

The communication unit 38*a*, which is mainly implemented by the instructions of the CPU 301 with respect to the short-range communication circuit 320, communicates various data with the communication unit 28*a* of the smartphone 2*a*. In the case of wired communication, the smart meter 3*a* is connected to the smartphone 3*c* via a communication cable to communicate data with other device.

The storing and reading unit 39*a*, which is mainly implemented by instructions of the CPU 301, stores various data (or information) in the storage unit 3000*a* and reads various data (or information) from the storage unit 3000*a*.

Functional Configuration of Smart Meter 3*c*

As illustrated in FIG. 5, the smart meter 3*c* includes a transmission and reception unit 31*c*, a measurement unit 33*c*, a display control unit 34*c*, a communication unit 38*c*, and a storing and reading unit 39*c*. These units are caused to function by operating one or more hardware components illustrated in FIG. 3 in cooperation with instructions of the CPU 301 according to the program for smart meter loaded from the NVRAM 304 to the RAM 303.

Further, the smart meter 3*c* includes a storage unit 3000*c* implemented by the ROM 302, the RAM 303, and the NVRAM 304 illustrated in FIG. 3.

The respective units of the smart meter 3*c* (transmission and reception unit 31*c*, measurement unit 33*c*, display control unit 34*c*, communication unit 38*c*, and storing and reading unit 39*c*) are substantially the same in function to corresponding units of the smart meter 3*a* (transmission and reception unit 31*a*, measurement unit 33*a*, display control unit 34*a*, communication unit 38*a*, and storing and reading unit 39*a*), so that description thereof is omitted.

Similarly to the smart meter 3*c*, the smart meter 3*b* is substantially the same in functional units to the smart meter 3*a*, but FIG. 5 omits the smart meter 3*b* as the smart meter 3*b* is not referred in the following description.

Functional Configuration of Intermediary Server 5

For simplicity, FIG. 6 also illustrates a block diagram of a functional configuration of the intermediary server 5.

FIG. 6 is a block diagram illustrating a functional configuration of the intermediary server and the node in the tracking system. As illustrated in FIG. 6, the intermediary server 5 includes a transmission and reception unit 51, a deciding unit 53, a display control unit 54, a determination unit 55, a creation unit 58, and a storing and reading unit 59. These units are functions or means implemented by or caused to function by operating one or more hardware components illustrated in FIG. 4 in cooperation with instructions of the CPU 501 according to the program for the intermediary server loaded from the HD 504 to the RAM 503.

Further, the intermediary server 5 includes a storage unit 5000 implemented by the ROM 502 and the HD 504 illustrated in FIG. 4.

User Management Table

FIG. 7A is a conceptual diagram illustrating a user management table. The user management table is a table used by the intermediary agent Da to manage each user such as a consumer of electricity. Specifically, the storage unit 5000 includes a user management DB 5001, implemented by a user management table as illustrated in FIG. 7A. The user management table stores a user ID, a user name, a user's address (or location where the user resides), and a selectable supplier ID in association.

Of these items, the user ID is an example of user identification information for identifying the user of an asset, such as the consumer Ca of electricity. The selectable supplier ID is an example of supplier identification information for identifying a supplier, such as a producer of electricity, which can be selected by the user identified with the user ID. For example, if the user's address is in Tokyo, the selectable suppliers are limited to those suppliers that have addresses in or around Tokyo.

Supplier Management Table

FIG. 7B is a conceptual diagram illustrating a supplier management table. The supplier management table is a table used by the intermediary agent Da to manage each supplier such as a producer of electricity. The storage unit 5000 stores a supplier management DB 5002, which is implemented by the supplier management table as illustrated in FIG. 7B. The supplier management table includes, for each supplier, a supplier ID, a supplier name, a production method type of the supplier for an asset such as electricity, and an amount of asset that can be supplied, in association.

Of these items, the supplier ID is an example of supplier identification information for identifying the supplier of asset such a producer of electricity. The production method type is based on a type of energy resource used to produce the asset. As described above, example types of the production method include methods using solar light, wind power, biomass, geothermal power, hydraulic power, petroleum, coal, and liquefied natural gas. The above-described types of production method may be classified into one or more groups, such as the group of production methods using renewable energy or the group of production methods using such as fossil fuel.

The amount that can be supplied is an amount of assets that can be supplied by a supplier, such as producer, for a certain time duration (or a certain time period). For example, the amount of assets that can be supplied is an amount of electric energy (kWh).

Transaction Details Management Table

FIG. 8A is a conceptual diagram illustrating a transaction details management table. The transaction details management table is a table used for managing transaction details of asset, set by the user such as the consumer Ca. The transaction details management table may alternatively referred to as a usage plan management table, as it contains information to be used for planned usage of asset. The storage unit 5000 includes a transaction details management DB 5003, which is implemented by the transaction details management table as illustrated in FIG. 8A. The transaction details management table includes information on details of transactions. Specifically, the transaction details management table includes a user ID, usage start date, usage end date, planned usage amount, renewable energy usage ratio, supplier ID, a supplier name, and production method type of asset, in association. The same data items stored both in the tables of FIGS. 7A and 7B, such as the user ID, are each designated with the same item name.

Of these, the usage start date is information indicating the date when the user such as the consumer Ca starts using the asset such as electricity. The usage end date is information indicating the date when the user ends using the asset such as electricity. The planned usage amount is the amount of asset that the user plans to use for a certain time duration (or a certain time period), and can be expressed in terms of electric energy (kWh). The renewable energy usage ratio is information indicating a ratio (%) of assets produced from renewable energy such as solar light, with respect to total amount of assets, such as electricity, to be used by the user such as the consumer Ca.

Transaction History Management Table

FIG. 8B is a conceptual diagram illustrating a transaction history management table. The transaction history management table is a table for managing, for each user, a history of transactions that the intermediary server 5 intermediates transfer of asset, which is obtained from the supplier such as the producer. The transaction history management table may be alternatively referred to as a usage history management table.

The storage unit 5000 includes a transaction history management DB 5004, which is implemented by the transaction history management table as illustrated in FIG. 8B.

The transaction history management table manages transaction history information, specifically, the transfer date and time, the transaction amount, the production method type, and the total transaction amount by production method type, in association. In this example, a type of resource (an energy resource) used to produce asset can be referred to as a "production method type" indicating that a method of producing asset using a predetermined type of resource. For example, when the asset is electricity, the "production method type" corresponds to a method of producing electricity from such as solar light. Although this embodiment describes a case in which one type of production method uses solar light and another type of production method uses oil, any other type of production method may be used, such as a type of production method using wind power or a type of production method using coal. Further, the above-described types of production method may be classified into one or more groups, such as the group of production method types using renewable energy or the group of production method types using fossil fuel.

Of the transaction history information, the same data items stored in the tables of FIGS. 7A and 7B, such as the user ID, are each designated with the same item name. In this example, the transfer date and time indicates the date and time when ownership of asset is transferred, specifically, the date and time when the intermediary server 5 transfers the ownership of the asset acquired from the supplier, such as the producer, to the user such as the consumer Ca. The transaction amount indicates an amount of asset that the intermediary server 5 acquires its ownership from the supplier and provides the acquired ownership to the user. The amount of asset is represented by, for example, electric energy (kWh). The total transaction amount indicates a total amount of assets, which are produced by a specific production method and allocated to a user such as the consumer Ca for a certain duration of time (or a certain period of time), and is expressed in total electric energy (kWh), for example. The intermediary server 5 refers to the transaction history management DB 5004 to determine a production method type of asset to be allocated to the user such as the consumer Ca. For example, when a ratio of electricity having been produced using renewable energy is set to 40 by the consumer Ca, the intermediary server 5 refers to the total transaction amount in the transaction history management DB 5004, to determine a production method type of asset to be provided to the consumer Ca.

Since the planned usage amount (for example, 20 kWh) illustrated in FIG. 8A is a planned usage amount for every hour, the transaction amount will be half the planned usage amount (for example, 10 kWh), when transferring the ownership of asset is performed every 30 minutes.

Although this embodiment describes a case in which one type of production method uses solar light and another type of production method uses oil, any other type of production method may be used, such as a type of production method using wind power or a type of production method using coal. Further, the above-described types of production method may be classified into one or more groups, such as the group of production method types using renewable energy or the group of production method types using fossil fuel.

Furthermore, the production method type is based on a type of asset production process. The type of asset production process indicates a case in which any one of processes in producing the asset such as electricity differs. In one example, even when the same energy resource, such as solar, is used to produce electricity, there are one method for producing electricity using solar light and other method for producing electricity using solar heat. In another example, as another type of production method of asset, there are one method for producing electricity using a turbine, and other method for producing electricity without using a turbine.

Each Functional Unit of Intermediary Server

Next, each function unit of the intermediary server 5 is described in detail with reference to FIG. 6. The transmission and reception unit 51 of the intermediary server 5, which is implemented mainly by instructions of the CPU 501 with respect to the network I/F 509, controls transmission or reception of various data (or information) to or from other device (for example, the smartphone 2*a*, 2*c*) via the communication network 100. The transmission and reception unit 51 also serves as an input unit that receives the transaction details, described later, from the smartphone 2*c*.

The deciding unit 53, which is implemented by the instructions of the CPU 501, determines asset information indicating such as an ownership of the asset (the asset that the intermediary server 5 intermediates transfer of ownership) to be transferred to the user. It is assumed that transfer of asset, produced by a specific type of production method, is intermediated for a specific user such as the consumer Ca. In such case, the deciding unit 53 determines asset information on such asset, based on "history of transactions of asset produced by the specific type of production method for the specific user" stored in the transaction history management DB 5004, and "renewable energy usage ratio" previously stored in the transaction details management DB 5003. Specifically, when the renewable energy usage ratio for the consumer Ca is set to 40(%), the deciding unit 53 refers to the total transaction amount in the transaction history management DB 5004, to determine to transfer ownership of asset information indicating the asset produced from renewable energy, from the intermediary agent Da managing the intermediary server 5 to the consumer Ca, until the renewable energy usage ratio reaches 40(%).

The display control unit 54, which is mainly implemented by the instructions of the CPU 501, controls the display 506 to display various images, or controls the display 218 of the smartphone 2 to display various images via the communication network 100.

In this case, the smartphone 2 displays various images using functions provided by the web browser of the display control unit 24 of the smartphone 2. The display control units 24*a* and 24*c* may be collectively referred to as the display control unit 24.

The determination unit 55, which is implemented by the instructions of the CPU 501, makes various determinations.

The creation unit 58, which is implemented by the instructions of the CPU 501, creates an application form to be submitted by the intermediary agent to the certification authority E, based on the transaction information and the asset information. This application form is a predetermined application form, which is used to apply for a production method certificate, certifying that the asset is produced by a certain type of production method.

The storing and reading unit 59, which is mainly implemented by the instructions of the CPU 501, stores various data (or information) in the storage unit 5000 and reads various data (or information) from the storage unit 5000.

Functional Configuration of Node 9

As illustrated in FIG. 6, the node 9 includes a transmission and reception unit 91, a verification unit 93, a determination unit 95, a transaction processing unit 96, an asset processing unit 97, and a storing and reading unit 99. These units are functions or means implemented by or caused to function by operating one or more hardware components illustrated in FIG. 4 in cooperation with instructions of the CPU 901 according to the program for the node loaded from the HD 904 to the RAM 903.

The node 9 further includes a storage unit 9000, which is implemented by the ROM 902 and the HD 904 illustrated in FIG. 4. FIG. 6 illustrates a state in which transaction information is connected like a chain. The node 9 further stores asset information generated based on the transaction information. The transaction information and the asset information are stored in each node.

Each Functional Unit of Node

Next, each functional unit of the node 9 is described in detail with reference to FIG. 6. The transmission and reception unit 91 of the node 9, which is implemented mainly by instructions of the CPU 901 with respect to the network I/F 909, controls transmission or reception of various data (or information) to or from other node of the blockchain network 90 on the communication network 100. The transmission and reception unit 91 transmits or receives various data (or information) between the transmission and reception unit 31*a* of the smart meter 3*a* and the transmission and reception unit 51 of the intermediary server 5. Although the smart meter 3*b* is not illustrated in FIG. 6, the transmission and reception unit 91 actually transmits or receives various data (or information) to or from the smart meter 3*b*.

The verification unit 93, which is implemented by the instructions of the CPU 901, verifies the certificate and the provided information. The certificate verification is a process of determining whether or not a target certificate is a certificate of the entity that is registered in advance in the node 9. The verification of the supplier information is a process of determining whether or not all predetermined contents are entered in predetermined format (for example, whether the supplier is entered or the provision time period is entered).

The determination unit 95, which is implemented by the instructions of the CPU 901, makes various determinations.

The transaction processing unit 96, which is implemented by the instructions of the CPU 901, performs processing such as generating transaction information indicating a transaction causing generation of asset information and storing the transaction information in the storage unit 9000.

The asset processing unit 97, which is implemented by the instructions of the CPU 901, performs processing such as generating asset information according to the transaction information and storing the asset information in the storage unit 9000.

The storing and reading unit 99, which is mainly implemented by the instructions of the CPU 901, stores various data (or information) in the storage unit 9000 and reads various data (or information) from the storage unit 9000.

Processing or Operations

Next, processing or operation according to the present embodiment will be described with reference to FIGS. 9 to 19.

Registration of Intermediary Agent

Figure 9:
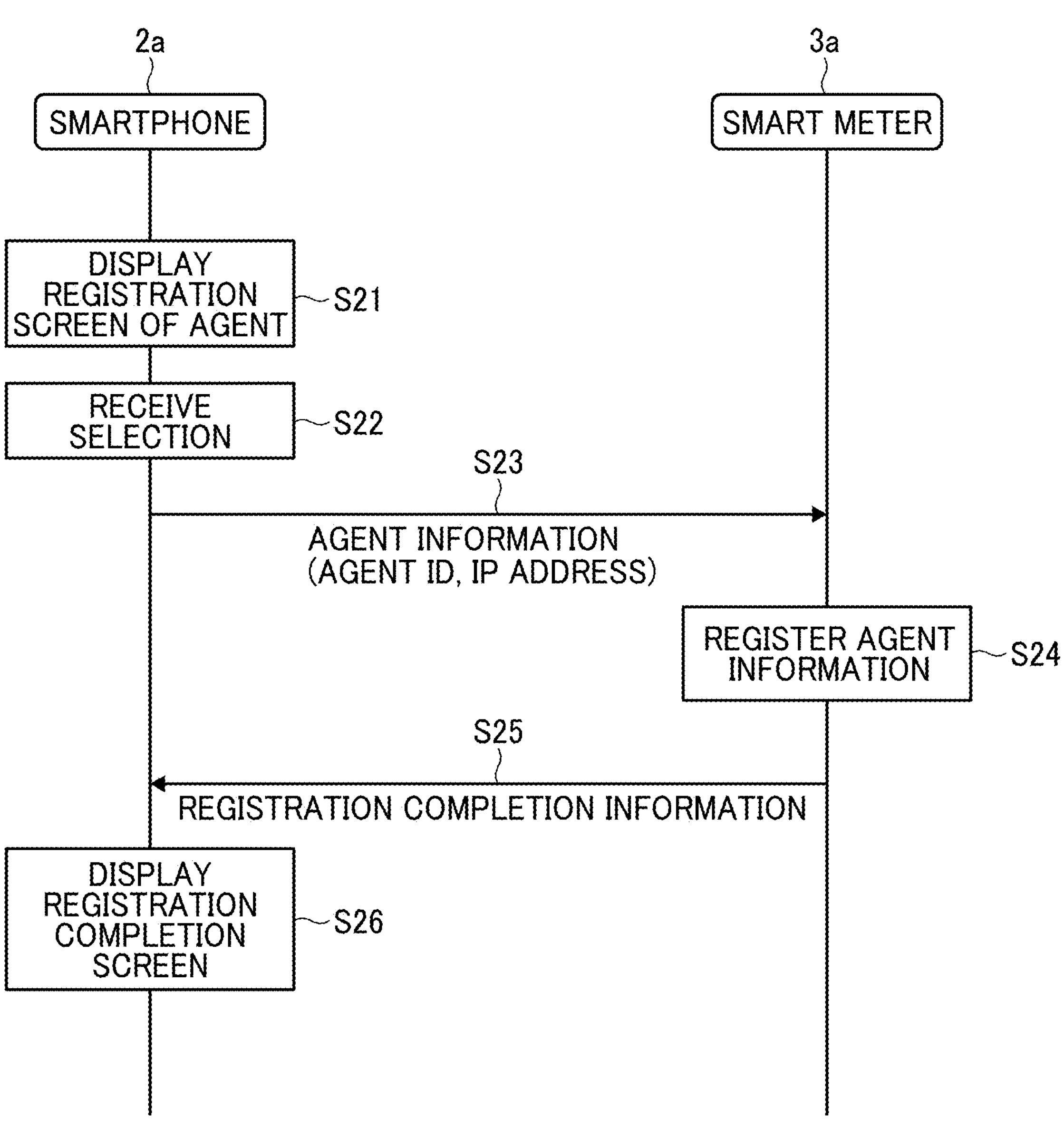
FIG. 9 is a sequence diagram illustrating example processing of registering intermediary agents.

Next, referring to FIGS. 9 and 10, processing of registering intermediary agents is described.

Figure 10B:
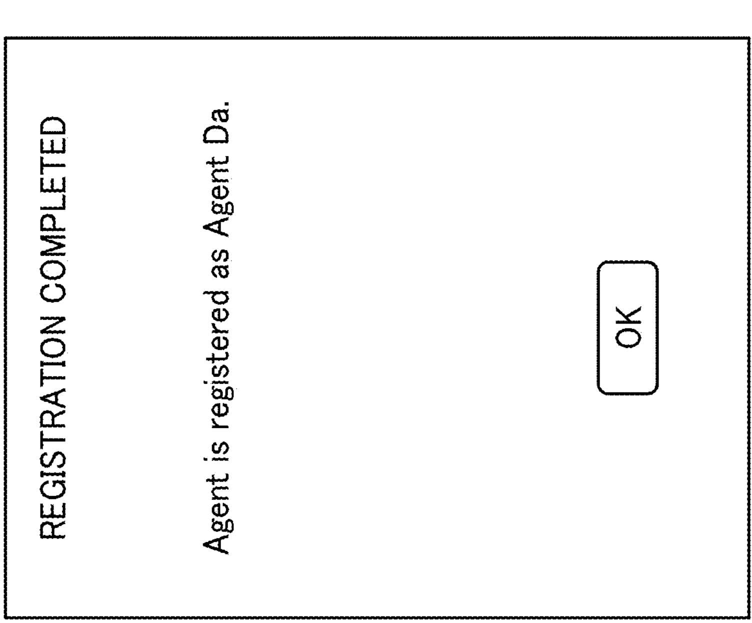
FIG. 10B is a diagram illustrating a display example of an intermediary agent registration screen.
Figure 10A:
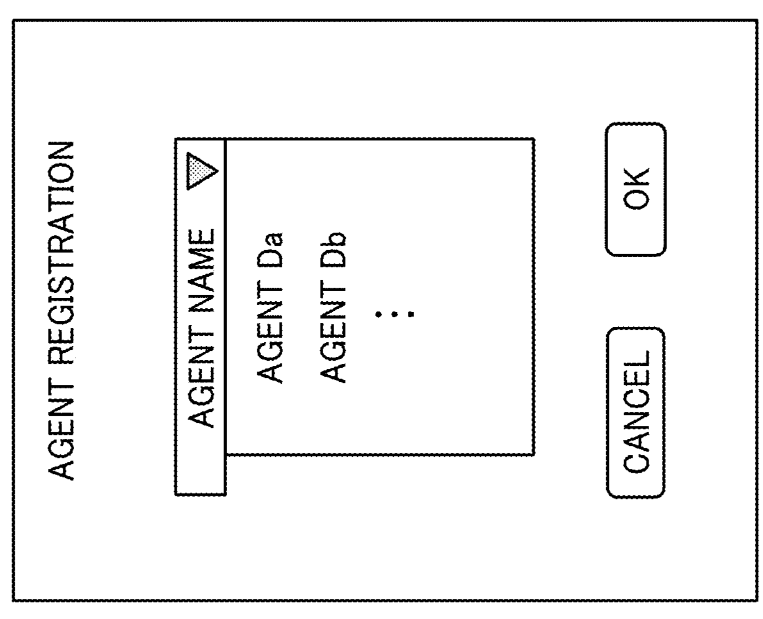
FIG. 10A is a diagram illustrating a display example of an intermediary agent registration screen.

FIG. 9 is a sequence diagram illustrating processing of registering intermediary agents. FIG. 10A is an illustration of an example intermediary agent registration screen. FIG. 10B is an illustration of an example intermediary agent registration completion screen. The following describes an example case in which the producer Aa registers the intermediary agent Da, from among a plurality of intermediary agents. It is assumed that the producer Aa previously makes a contract with the intermediary agent Da, such that the producer Aa is able to select the intermediary agent Da as described later. The smartphone 2*a* is previously installed with an application program for registering intermediary agents. This application program manages an intermediary agent ID for identifying the intermediary agent, a name of the intermediary agent, and an internet protocol (IP) address of an intermediary server of the intermediary agent, in association.

As illustrated in FIG. 9, at the smartphone 2*a*, the display control unit 24*a* controls the display 218 to display the intermediary agent registration screen illustrated in FIG. 10A (S21). The intermediary agent registration screen displays a pull-down menu, which lists a plurality of intermediary agent names for selecting a particular intermediary agent. The intermediary agent registration screen further includes, at its lower part, an “OK” button to be pressed to confirm the intermediary agent name selected from the pull-down menu, and a “CANCEL” button to be pressed to cancel the selection.

When the producer Aa selects a desired intermediary agent name from the plurality of intermediary agent names and presses the “OK” button, the input unit 22*a* receives the selection on the intermediary agent (S22). Here, the case where the intermediary agent Da is selected is described.

After the input unit 22*a* receives the selection, the communication unit 28*a* transmits information on the selected intermediary agent to the communication unit 38*a* of the smart meter 3*a* by short-range wireless communication (S23). The intermediary agent information includes an intermediary agent ID for identifying the selected intermediary agent and an IP address of an intermediary server of the selected intermediary agent. Accordingly, the communication unit 38*a* of the smart meter 3*a* receives the intermediary agent information.

Next, at the smart meter 3*a*, the storing and reading unit 39*a* registers the intermediary agent information in the storage unit 3000*a* (S24). Then, the communication unit 38*a* transmits registration completion information indicating that registration of the intermediary agent is completed to the smartphone 2*a* (S25). Accordingly, the communication unit 28*a* of the smartphone 2*a* receives the registration completion information.

Next, at the smartphone 2*a*, the display control unit 24*a* controls the display 218 to display the registration completion screen as illustrated in FIG. 10B (S26). The registration completion screen displays a message indicating that registration of the intermediary agent is completed. The registration completion screen further includes an “OK” button to be pressed to close the screen being displayed. When the producer Aa presses the “OK” button, the registration completion screen is closed.

The processing of registering the intermediary agent thus ends.

Registration Processing of Transaction Details

Figures 12A, 12B:
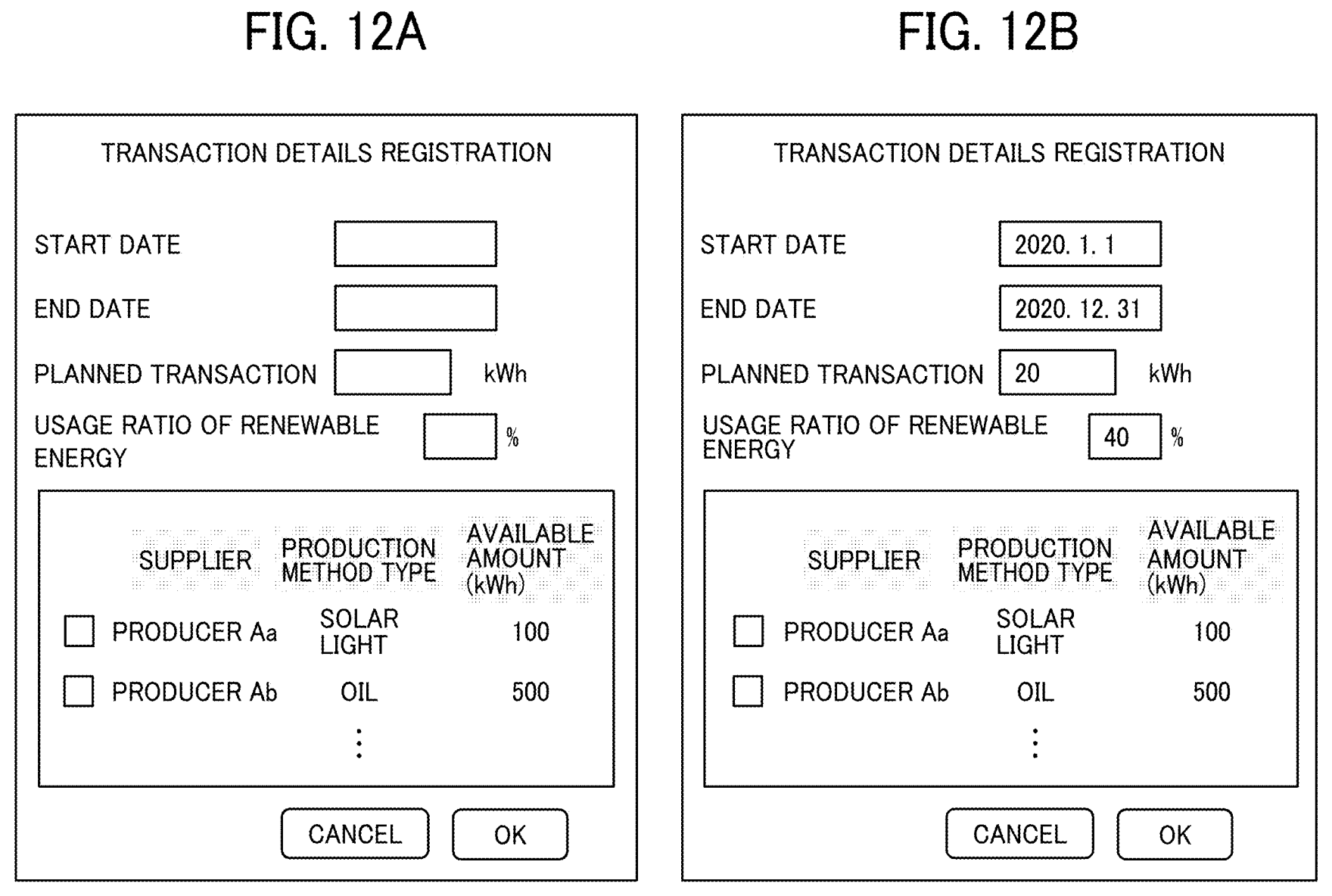

Next, referring to FIGS. 11 and 12, processing of registering transaction details of asset is described. FIG. 11 is a sequence diagram illustrating processing of registering transaction details of asset. FIG. 12A is an illustration of an example transaction details registration screen before information is entered or selected. FIG. 12B is an illustration of an example transaction details registration screen after information is entered or selected. The following describes the example case in which the consumer Ca registers the transaction details of electricity, as an asset, to the intermediary server 5 using the smartphone 2*c*.

As illustrated in FIG. 11, the transmission and reception unit 21*c* of the smartphone 2*c* transmits a request for displaying a transaction details registration screen to the intermediary server 5 via the communication network 100 (S41). The display request includes a user ID for identifying the consumer Ca as a user who is the request source. Accordingly, the transmission and reception unit 51 of the intermediary server 5 receives the display request. The user ID is an example of user identification information. Examples of the user identification information include a number for uniquely identifying an individual, which may be designated by a local public institution, such as a my number in Japan, and a telephone number of the individual or the company.

Next, at the intermediary server 5, the storing and reading unit 59 searches the user management DB 5001 (see FIG. 7A) using the user ID received at S41 as a search key, to read out all selectable supplier IDs associated with the user ID (S42). Further, the storing and reading unit 59 searches the supplier management DB 5002 using each supplier ID read at S42 as a search key, to read out various information associated with the supplier (supplier name, production method type information, and amount that can be supplied) (S43). The display control unit 54 generates a transaction details registration screen as illustrated in FIG. 12A based on the information read at S43 (S44). Accordingly, at the smartphone 2*c*, the display control unit 24*c* uses its web browser function to display, on the display 218 of the smartphone 2*c*, the transaction details registration screen illustrated in FIG. 12A that is generated by the intermediary server 5 (S45). The transaction details registration screen includes a plurality of fields (usage time period of asset (in this case, electricity), usage end date of asset, planned usage amount of asset, and renewable energy usage ratio), and a plurality of check boxes each for selecting a supplier of the asset. The transaction details registration screen further includes, at its bottom, an "OK" button to be pressed to confirm the usage plan such as the entered items of the input fields and the checked boxes, and a "CANCEL" button to be pressed to cancel all the transaction details without being confirmed.

Here, the consumer Ca operates the touch panel of the smartphone 2*c* to enter any desired numerical value in each input field. The consumer Ca further checks a check box of any desired supplier. When the consumer Ca presses the "OK" button, the input unit 22*c* receives the entered and checked items as the transaction details (S46). The renewable energy usage ratio indicates a ratio of renewable energy in use, to total energy in use to produce electricity that the consumer Ca wants to acquire.

Here, the consumer Ca selects the producer Aa that produces electricity from solar light as energy for production. However, since the producer Aa does not produce any electricity at night, the consumer Ca additionally selects the producer Ab that produces electricity from oil, in consideration of replacing with another type of energy. The renewable energy usage ratio is set to 40%.

Next, the transmission and reception unit 21*c* of the smartphone 2*c* transmits transaction details information indicating the entered and selected items to the intermediary server 5 via the communication network 100 (S47). Accordingly, the transmission and reception unit 51 of the intermediary server 5 receives the transaction details information, to accept the transaction details.

Next, at the intermediary server 5, the storing and reading unit 59 stores, in the transaction details management DB 5003 (see FIG. 8A), the transaction details information received at S47 in association with the user ID received at S41 (S48).

The processing of registering transaction details thus ends.

Processing of Setting the Intermediary Agent as an Owner of the Asset

Figure 13:
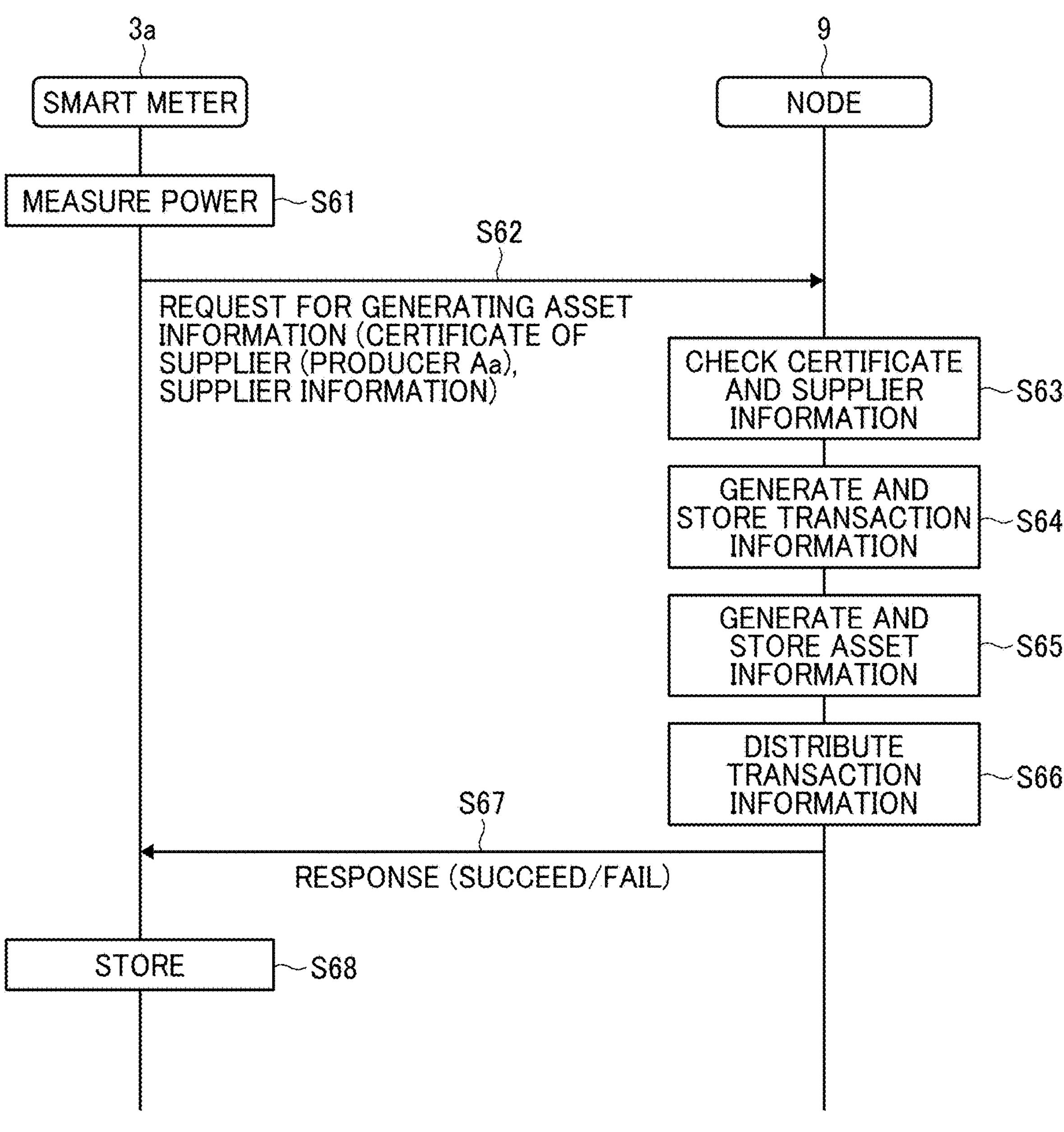
FIG. 13 is a sequence diagram illustrating processing of setting the intermediary agent as an owner of the asset provided by the supplier, according to the exemplary embodiment.

Referring now to FIGS. 13 and 14, processing of setting the intermediary agent as an owner of the asset provided by the supplier is described. FIG. 13 is a sequence diagram illustrating processing of setting the intermediary agent as an owner of the asset provided by the supplier. FIG. 14 is a conceptual diagram illustrating transaction information and asset information. The following describes the example case in which the smart meter 3*a* of the producer Aa requests the node 9*a* to set the intermediary agent as an owner of the asset.

As illustrated in FIG. 13, the measurement unit 33*a* measures electricity supplied from the power generator 4*a* to the power grid network 10 (S61). The transmission and reception unit 31*a* of the smart meter 3*a* transmits a request for generating asset information to the node 9*a* of the blockchain network 90 every predetermined time (for example, every 30 minutes) (S62). This request includes an electronic certificate certifying that the producer Aa is a legitimate registered supplier, and supplier information, so that the smartphone 2*a* of the producer Aa as the supplier can access the blockchain network 90. The supplier information includes various information on the supplier of the asset, such as the supplier, the date and time that asset is supplied, an available amount of asset, a production method type of asset, and an owner of asset. Accordingly, the transmission and reception unit 91 of the node 9*a* receives the request for generating asset information (S62). This supplier information is information used for generating the transaction information illustrated in FIG. 14. The contents of the supplier information are determined in advance by a smart contract of the blockchain (contract automation).

Next, the verification unit 93 of the node 9*a* verifies the certificate and the supplier information received at S62 (S63). The following describes the example case in which the verification result indicates that verification is successful.

Next, the transaction processing unit 96 uses the supplier information received at S62 to generate transaction information as illustrated in FIG. 14 and stores the transaction information in the storage unit 9000 (S64). In this case, the transaction processing unit 96 assigns a transaction ID and sets a transaction type. The transaction information includes a transaction ID, transaction type, and supplier information (supplier, provision date and time, available amount, production method, and owner).

Of these items, the transaction ID is an example of unique identification information for identifying transaction information. The transaction type is information indicating a type of processing to be performed in relation to the asset information. In FIG. 14, since the transaction type is generation of asset information, the asset processing unit 97 generates asset information. The supplier is identification information identifying a supplier of asset.

The provision date and time is information indicating the date and time when the asset is supplied from the supplier. The available amount is information indicating an amount of electricity that the supplier can provide within a certain time period. The type of production method is information indicating a type of production method illustrated in FIG. 8B. The owner is information indicating an owner of asset, who has ownership of the asset.

Next, the asset processing unit 97 generates the asset information illustrated in FIG. 14 according to the transaction information illustrated in FIG. 14 and stores the asset information in the storage unit 9000 (S65). In this case, the asset processing unit 97 sets the supplier information (supplier, date and time of provision, available amount, production method, and owner) in the transaction information, the transaction valid date, and the transaction status of the asset information. The transaction valid date is set, for example, one month after the date and time of provision. Further, the transaction status is information indicating whether or not the asset information has been transferred (assigned or not) to the user by the intermediary server 5. In FIG. 14, the transaction status of "not transferred" indicates that the asset has not been transferred to (allocated to) the user, that is, the intermediary agent has not yet provided the asset information to the user.

Further, the transmission and reception unit 91 of the node 9 distributes the transaction information generated at S64 as a block to the other nodes 9 of the blockchain network 90 (S66). Each of the other nodes 9 verifies the block, and adds the verified block to a chain of blocks already saved in each node. Each of the other nodes 9 then generates asset information in the same manner as S65 according to the transaction information, and stores the asset information in each storage area. A plurality of items of transaction information may be stored in one block.

Next, the transmission and reception unit 91 of the node 9 transmits a response to the smart meter 3*a* in response to the request received at S62 (S67). The response indicates whether generation of asset information is successful or fails. Accordingly, the transmission and reception unit 31*a* of the smart meter 3*a* receives the response.

Next, at the smart meter 3*a*, the storing and reading unit 39*a* stores contents of the response in the storage unit 3000*a* (S68).

As described above, the asset information indicating that the owner of the asset is the intermediary agent Da is managed on the blockchain network, to complete processing of providing asset information from the supplier to the intermediary agent.

Processing of Providing Asset Information from the Intermediary Agent to the User Referring now to FIGS. 15 and 18, processing of setting the user as an owner of the asset, for which transfer is intermediated by the intermediary agent, is described. FIG. 15 is a sequence diagram illustrating processing of setting the user as an owner of the asset, for which transfer is intermediated by the intermediary agent.

First, the transmission and reception unit 31*c* of the smart meter 3*c* of the consumer Ca transmits usage information on usage of electricity, as asset, every predetermined time (for example, every 30 minutes) via the communication network 100 (S81). This usage information includes various information, such as information indicating a usage status of electricity as asset, a user ID for identifying the consumer Ca as the user, the amount of electricity being used as asset, and a time during when electricity is used as asset. The transmission and reception unit 51 of the intermediary server 5 receives the usage information.

The transmission and reception unit 51 transmits a request for all asset information in which the intermediary agent Da of the intermediary server 5 is set as an owner, to the node 9 of the blockchain network 90 (S82). This request includes an electronic certificate certifying that the intermediary server 5*a* managed by the intermediary agent Da is a server that can access the blockchain network 90, and information indicating the intermediary agent Da as an owner. Accordingly, the transmission and reception unit 91 of the node 9 receives the request for all asset information.

Next, the verification unit 93 of the node 9 verifies the certificate received at S82 (S83). The certificate verification is a process of determining whether or not the received certificate is a certificate of the server that is registered in advance in the node 9. The following describes the example case in which the verification result indicates that verification is successful.

The storing and reading unit 99 of the node 9 reads out all items of asset information regarding assets indicating that the intermediary agent Da of the intermediary server 5 as the owner (S84). The transmission and reception unit 91 transmits all items of asset information read at S84 to the intermediary server 5 (S85). Accordingly, the intermediary server 5*a* receives all asset information with ownership that is currently assigned to the intermediary agent Da and can be allocated to the user. The transmission and reception unit 51 of the intermediary server 5 receives all the asset information. Next, the storing and reading unit 59 of the intermediary server 5 searches the transaction details management DB 5003 using the user ID received at S81 as a search key to read out transaction details information corresponding to the user ID (S86). Further, the storing and reading unit 59 searches the transaction history management DB 5004 using the user ID received at S81 as a search key to read out total transaction amount of asset for each production method corresponding to the user ID (S87). For example, from the transaction history management DB 5004 of FIG. 8B, the storing and reading unit 59 reads 20 (kWh) as total transaction amount of electricity produced from solar light, and 160 (kWh) as total transaction amount of electricity produced from oil.

Next, the deciding unit 53 determines a type of production method of asset, for particular asset information to be transferred to the consumer Ca as the user, based on the transaction details information read at S86 and total transaction amount of asset by each production method that is read at S87 (S88). For example, when the transaction details information indicates two types of production method "solar light" and "oil" are set, since the transaction history information indicates that the total transaction amount is 20 kWh for solar light and 160 kWh for oil, the deciding unit 53 determines the type of production method to be "solar light" so as to achieve the renewable energy usage ratio of 40%.

The storing and reading unit 59 stores information on a processing result of S88 in the transaction history management DB 5004 (S89). Specifically, for example, the storing and reading unit 59 adds, to the transaction history management DB 5004 (see FIG. 8B), a record having the transaction date and time of "2020.1.1 9:00-9:30", the transaction amount of 10 kWh, the production method type of solar light, and the total transaction amount of electricity produced from solar light of 30 kWh.

Next, the transmission and reception unit 51 of the intermediary server 5 transmits a request for changing the asset information to the node 9 of the blockchain network 90 (S90). This change request includes an asset ID for identifying the asset information indicating the asset produced using the specific production method type that is determined at S88, from among the asset information received at S85.

The change request, transmitted at S90, also includes various information such as a new owner and an amount of asset consumed. The information indicating the new owner may be the user ID received at S81 or the name of the user as the new owner. When there are a plurality of items of asset information on the asset produced using the specific type of production method determined at S88, the transmission and reception unit 51 determines a request for changing particular asset information, related to the asset having a valid date closet to the current date, from among the plurality of items of asset information.

Next, at the node 9, the verification unit 93 verifies each item of information (asset ID, owner, consumed amount) received at S90 (S91). This verification processing is for determining whether or not each item of information has a predetermined content that is written in a predetermined format. The following describes the example case in which the verification result indicates that verification is successful.

Next, the node 9 generates transaction information and changes (or generates) asset information, according to the change request received at S90 (S92).

Figure 16:
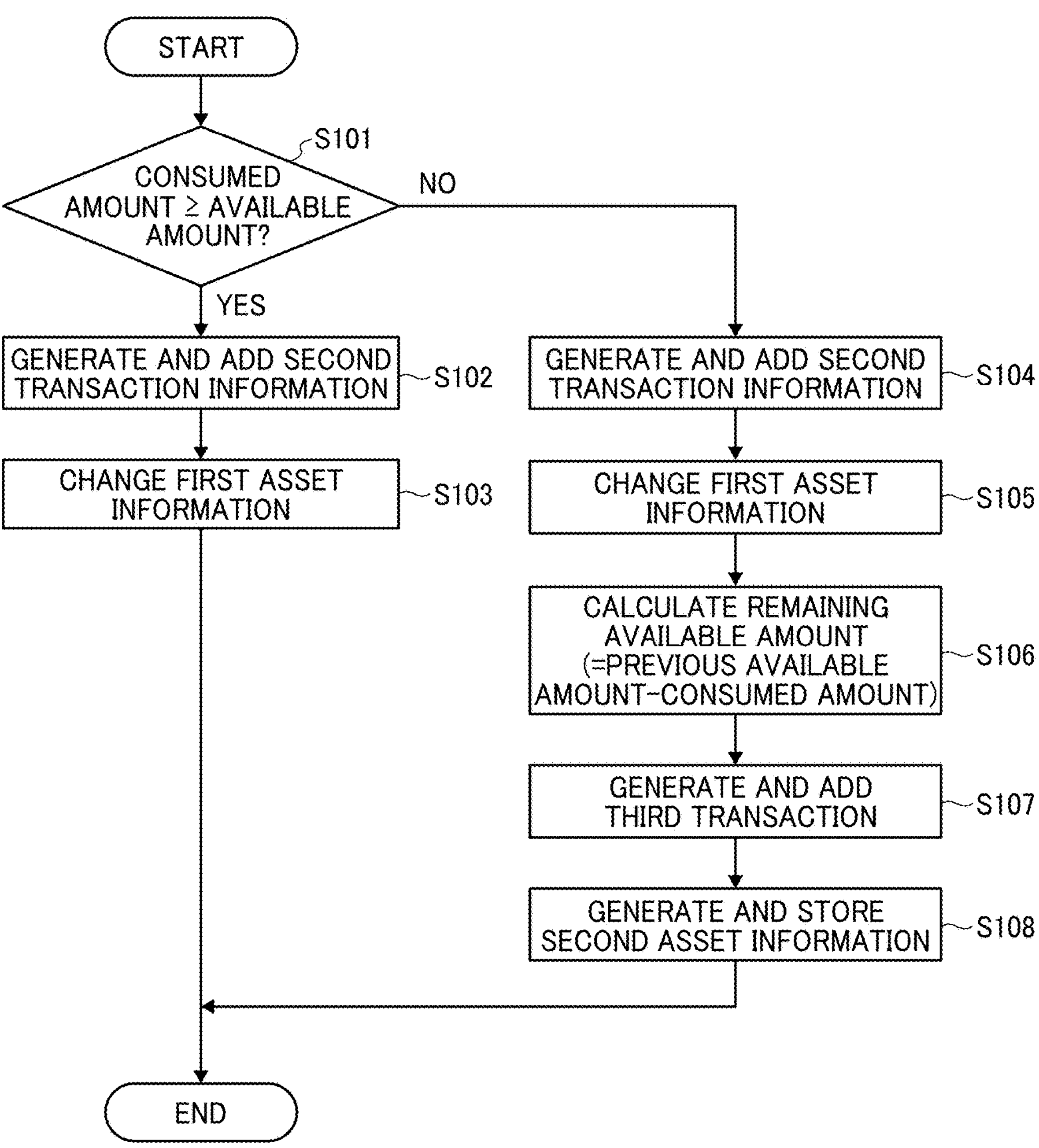
FIG. 16 is a flowchart illustrating processing of generating transaction information and generating or changing asset information, according to the exemplary embodiment.
Figure 17:
FIG. 17 is a conceptual diagram illustrating transaction information and asset information, when usage amount of electricity is equal to or greater than available amount, according to the exemplary embodiment.

The processing of S92 is described in detail with reference to FIGS. 16 to 18. FIG. 16 is a flowchart illustrating detailed processing of S91 of FIG. 15, specifically, processing of generating transaction information and generating or changing asset information. FIG. 17 is a conceptual diagram illustrating transaction information and asset information, when the usage amount of electricity is equal to or greater than the available amount of electricity (YES at S101 of FIG. 16). FIG. 18 is a conceptual diagram illustrating transaction information and asset information, when the usage amount of electricity is less than the available amount of electricity (NO at S101 of FIG. 16).

As illustrated in FIG. 16, the determination unit 95 of the node 9 determines whether or not the usage amount of asset by the user that is received at S90 (in this example, the consumed amount of the consumer Ca) is equal to or greater than the available amount that is managed with the asset information (S101).

Example that all available amount is consumed When the determination unit 95 determines that the usage amount of asset by the user is equal to or greater than the available amount managed with the asset information (YES at S101), the transaction processing unit 96 generates second transaction information as illustrated in FIG. 17. Then, the transaction processing unit 96 adds a block containing the second transaction information to the chain of blocks containing the first transaction information, which is stored in the storage unit 9000 (S102). Then, the asset processing unit 97 changes contents of the first asset information according to the second transaction information (S103).

The processing of S102 and S103 is described in detail with reference to FIG. 17. The first transaction information and the first asset information illustrated on the left side of FIG. 17 are the same as the transaction information and the asset information of FIG. 14, respectively. The following describes an example case in which, after the smart meter 3*a* sets the owner of the asset to the intermediary agent Da (the first asset information is generated based on the first transaction information), the intermediary server 5 changes the owner of the asset to the consumer Ca (the first asset information is changed based on the second transaction information), as the intermediary agent Da intermediates transfer of the asset information (ownership of asset).

At S102, the transaction processing unit 96 generates the second transaction information as illustrated in FIG. 17. The second transaction information includes a unique transaction ID and a transaction type indicating transfer of asset information. The second transaction information additionally includes the transfer date and time when transfer of asset information is intermediated, a new owner of asset as a result of intermediation, an asset ID for identifying the asset information subjected to transfer, and a consumed amount of asset (in this example, electricity) received at S90.

Then, at S103, the asset processing unit 97 changes the first asset information as illustrated in FIG. 17. The asset processing unit 97 changes the "available amount" in the first asset information to the "consumed amount", and changes the owner from the "intermediary agent Da" in the first asset information to the "consumer Ca". Furthermore, since all of available amount has been consumed (YES at S101), no more asset can be allocated. Therefore, the asset processing unit 97 changes the transaction status from "not transferred" in the first asset information to "transferred". The asset information whose transaction status has been changed to "transferred" through this processing will be excluded from a target of transfer in the future. Therefore, the transaction processing unit 96 does not refer to the asset information having the transaction status of "transferred", as asset information subjected to processing the transaction information having the transaction type of "transfer asset information". That is, the asset information excluded from the target of transfer is not re-transferred.

As described above, when all the available amount of the asset is consumed, new asset information is not generated, but the asset information is changed.

Subsequently, returning to FIG. 15, the transmission and reception unit 91 of the node 9 transmits a response to the request received at S90 to the intermediary server 5 (S93). This response indicates that processing performed in response to the request received at S90 succeeded or failed. The transmission and reception unit 51 of the intermediary server 5 receives the response.

Next, the transmission and reception unit 51 of the intermediary server 5 transmits a response to the information transmitted at S81 to the smart meter 3*c* (S94). Accordingly, the transmission and reception unit 31*c* of the smart meter 3*c* receives the response from the intermediary server 5. This response includes contents of response (success or failure) received at S93, and is stored for management or displayed by the smart meter 3*c*.

Example that not all available amount is consumed At S101 of FIG. 16, when the determination unit 95 determines that the usage amount of asset by the user is less than the available amount managed with the asset information (NO at S101), the transaction processing unit 96 generates second transaction information as illustrated in FIG. 18. Then, the transaction processing unit 96 adds a block containing the second transaction information to the chain of blocks containing the first transaction information, which is stored in the storage unit 9000 (S104).

The asset processing unit 97 changes contents of the first asset information according to the second transaction information (S105).

The processing of S104 and S105 is described in detail with reference to FIG. 18. The first transaction information and the first asset information illustrated on the left of FIG. 18 are the same as the transaction information and the asset information of FIG. 14, respectively. The following describes an example case in which, after the smart meter 3*a* sets the owner of the asset to the intermediary agent Da (the first asset information is generated based on the first transaction information), the intermediary server 5 changes the owner of the asset to the consumer Ca (the first asset information is changed based on the second transaction information), as the intermediary agent Da intermediates transfer of the asset information (ownership of asset).

At S104, the transaction processing unit 96 generates the second transaction information as illustrated in FIG. 18. The second transaction information includes a unique transaction ID and a transaction type indicating transfer of asset information. The transaction type of "transfer asset information" does not only function as an instruction to change the owner of the asset in the first asset information, but also functions as an instruction to generate third transaction information used for generating second asset information indicating ownership of remaining asset when there is excessive amount of asset after transfer. Accordingly, the transaction processing unit 96 continues processing to generate the third transaction information. The second transaction information additionally includes the transfer date and time when transfer of asset information is intermediated, a new owner of asset as a result of transfer, an asset ID for identifying the asset information that is transferred (transaction), and a consumed amount of asset (in this example, electricity) received at S90.

Then, at S105, the asset processing unit 97 changes the first asset information as illustrated in FIG. 18. The asset processing unit 97 changes the "available amount" in the first asset information to the "consumed amount", and changes the owner from the "intermediary agent Da" in the first asset information to the "consumer Ca". Furthermore, since the consumed amount of asset can no longer be allocated, the asset processing unit 97 changes the transaction status from "not transferred" in the first asset information to "transferred". However, what is different from the case of FIG. 17 is that there is a remaining amount after the transfer (NO at S101). Therefore, the transaction processing unit 96 calculates a remaining available amount (S106). In this case, the remaining available amount (here, "4") can be obtained by subtracting the consumed amount (here, "6") from the previous available amount (here, "10").

Subsequently, in order to newly generate asset information to manage remaining available amount, the transaction processing unit 96 generates third transaction information as illustrated in FIG. 18. Then, the transaction processing unit 96 adds a block containing the third transaction information to the chain of blocks containing the second transaction information, which is stored in the storage unit 9000 (S107). The asset processing unit 97 generates second asset information according to the third transaction information, and stores the second asset information in the storage unit 9000 (S108).

The processing of S107 and S108 is described in detail with reference to FIG. 18. The following describes an example case in which, after the intermediary server 5 changes the owner of the asset to the consumer Ca (the first asset information is changed based on the second transaction information and the third transaction information is generated), the intermediary server 5 newly stores the remaining available amount (the second asset information is generated based on the third transaction information), to manage the asset information (ownership of asset) on the remaining available amount as a subject to transfer to be intermediated by the intermediary agent Da.

At S107, the transaction processing unit 96 generates the third transaction information as illustrated in FIG. 18. This third transaction information includes the same data items as the first transaction information, although specific values may be different from those of the first transaction information. The third transaction information includes a unique transaction ID and "generate asset information" as a transaction type. The third transaction information includes information on a supplier of the asset information, the provision date and time that the asset information is provided from the supplier, the available amount of asset, the production method type, and the owner of asset.

Then, at S108, the asset processing unit 97 generates the second asset information as illustrated in FIG. 18. This second asset information have same data items as those of the first asset information, but specific values of the items may be different from those of the first asset information. Specifically, the second asset information differs from the first asset information, such that the available amount has a value calculated at S106 (here, "4").

As described above, when there is a remaining available amount of asset, new asset information is generated, which indicates the remaining available amount.

The processing then returns to FIG. 15 to perform processing as described above referring to S93 and 94, such that description thereof is omitted.

Intermediating Processing of Production Method Certificate

Next, referring to FIG. 19, processing of intermediating procedure for obtaining a production method certificate is described. FIG. 19 is a sequence diagram illustrating processing of intermediating procedure for obtaining a production method certificate of asset. The consumer Ca transmits a request for obtaining a production method certificate from the certification authority E, to the intermediary agent Da. The production method certificate certifies that electricity consumed by the consumer Ca has been produced from renewable energy, such as a solar light. The following describes this processing in detail.

As illustrated in FIG. 19, according to operation of the consumer Ca on the smartphone 2*c*, the transmission and reception unit 21*c* transmits a request for obtaining a production method certificate of asset via the communication network 100 (S201). Accordingly, the transmission and reception unit 51 of the intermediary server 5 receives the request. This request includes a user ID for identifying the consumer Ca as the user, and transaction period information indicating a transaction time period during when transaction of asset is being carried out. For example, the consumer Ca requests for a production method certificate for a specific transaction time period, for example, from Jan. 1, 2020 to Jan. 31, 2020.

Next, the transmission and reception unit 51 of the intermediary server 5 transmits a request for transaction information and asset information to the node 9 of the blockchain network 90 (S202). This request includes information on a certificate of the user (here, consumer Ca) that the intermediary server 5 previously acquires from the smartphone 2*c*, information indicating the user as the owner (here, consumer Ca), and a transaction time period. Accordingly, the transmission and reception unit 91 of the node 9 receives the request.

The certificate of the intermediary server 5 has the same contents as that of the certificate transmitted at S82. Further, the transaction period information has the same contents as that of the transaction period information received at S121.

Next, the verification unit 93 of the node 9 verifies the certificate received at S202 (S203). The certificate verification is a process of determining whether or not the received certificate is a certificate of the server that is registered in advance in the node 9.

The following describes the example case in which the verification result indicates that verification is successful.

Next, the storing and reading unit 99 reads out the transaction information and the asset information in which the consumer Ca is set as the owner, within a specific transaction time period indicated by the transaction period information received at S202 (S204). In this case, the storing and reading unit 99 reads out particular transaction information having the transaction date and time that falls within the specific transaction time period and the new owner of the consumer Ca. Further, the storing and reading unit 99 reads the asset information having the asset ID, which is indicated by the particular transaction information that is read.

Then, the transmission and reception unit 91 of the node 9 transmits the requested transaction information and asset information to the intermediary server 5 (S205). Accordingly, the transmission and reception unit 51 of the intermediary server 5 receives the transaction information and the asset information.

Next, at the intermediary server 5, the creation unit 58 creates an application form to be submitted by the intermediary agent to the certification authority E, based on the transaction information and the asset information received at S205 (S206). This application form is used to apply for a production method certificate to prove the type of production method for the asset.

Subsequently, as illustrated in FIG. 1, the intermediary agent Da sends the application form created at S206 to the certification authority E by mail or the like (S1). Then, the certification authority E creates a production method certificate of asset, which certifies that 40% of electricity consumed by the consumer Ca has been produced from renewable energy such as solar light, and sends the production method certificate by mail or the like to the intermediary agent (S2). Then, the intermediary agent Da sends the production method certificate to the consumer Ca by mail or the like (S3). If necessary, the certification authority E may acquire transaction information and asset information from the blockchain network 90 and confirm the contents before issuing the production method certificate.

The processing of facilitating procedure for obtaining the production method certificate by the intermediary agent Da then ends. After receiving the production method certificate, the consumer Ca is able to use the production method certificate to enhance public image of the company or apply the government for a subsidy based on use of renewable energy.

According to the embodiment, since quality of assets, such as electricity, provided to the user is the same, it would be difficult to know a type of production method of the asset. In view of this, the node 9 of the blockchain network 90 manages asset information indicating a type of production method of asset and ownership of asset, and transaction information from which such asset information is generated, such that a production method of asset can be verified without fraud.

Moreover, in order to encourage stable consumption of electricity, it is necessary to adjust the consumed electricity and the produced electricity in real time to make them equal. Since the blockchain is a decentralized ledger system, it takes a certain amount of time to confirm consistency of each ledger information via the network. Therefore, it is not suitable to apply the blockchain technology to track use of such asset, which requires responsiveness in realtime. In view of this, in the embodiment, the intermediary server 5 is configured to transmit, to the blockchain network 90, a request for changing the ownership of the asset information on the blockchain network 90 from the original owner to the user (consumer Ca), not at a time when the consumer Ca starts using the asset such as electricity, but after the consumer Ca has consumed the asset (S89). Through this processing, which allows processing like deferred payment, the blockchain technology can be applied to an immediate exchange of asset, requiring real-time processing, to manage transfer of ownership of asset. Moreover, since the intermediary server 5 changes the asset information managed by the blockchain network 90 on behalf of the supplier (producer Aa, etc.) and the user (consumer Ca, etc.), the supplier (producer Aa, etc.) and the user (consumers Ca, etc.) can exchange electricity, without any need to consider whether the asset information has been changed.

Further, the intermediary server 5 is able to transfer the ownership of particular asset produced with a specific production method, and it can be applied to intermediate exchange of electricity produced from renewable energy such as solar light.

Other Embodiments

In any one of the above-described embodiments, the asset information includes information on the owner of the asset, however, the asset information may not include such information on the owner. For example, when the user is consuming electricity produced by the user, such that the user is the producer of the asset, there is no need to transfer the asset to another person (another company), as long as a type of production method can be verified.

Further, in any one of the above-described embodiments, electricity is used as an example of asset. Examples of asset include any other asset that physically exists (or exists in reality), and any other asset that does not physically exist (or not exit in reality).

Examples of asset that physically exists (or exists in reality) include, but are not limited to, foods such as grains, vegetables, fruits, meats, marine products or processed foods. When the assets are grains, vegetables and fruits, the asset information includes supplementary information indicating whether or not pesticides have been used, or information indicating a producer or a place of production. When the asset is meat, the asset information includes supplementary information indicating whether or not the animal is bred using a genetically modified crop, or information indicating a producer or a place of production. When the asset is a marine product such as fish or shellfish, the asset information includes supplementary information indicating a natural product or aquaculture, or information indicating a producer (fisherman) or a production area (fishing area). When the asset is a processed product, the asset information includes supplementary information indicating an allergen, information indicating whether or not the product has been processed using a genetically modified crop, or information indicating a location of a processor or a processing plant.

Examples of asset that physically exists (or exists in reality) include, but are not limited to, real estate such as land and buildings, and movable property such as goods or quantity of goods. When the asset is real estate, the asset information includes supplementary information such as ownership of the asset. When the asset is movable property, the asset information includes supplementary information such as ownership of the asset.

On the other hand, examples of asset that does not physically exist (or not exit in reality) include, but are not limited to, tokens (virtual currency) or quantity of tokens, carbon dioxide emission credits, intellectual property rights, and contracts. When the asset is a token, the asset information includes supplementary information on such as ownership of the asset. When the asset is a carbon dioxide emission credit, the asset information includes supplementary information on such as ownership of the asset. When the asset is a right such as an intellectual property right, the asset information includes supplementary information on such as the owner of the right, the transferee of the right, and the licensee. When the asset is a contract, the asset information includes supplementary information on such as contract conditions and contract performance. In addition or in alternative to contracts, treaties, agreements, promises, and memorandums (memos) may be treated as asset.

Further, other types of asset that can be managed in a substantially similar manner as the example case of electricity, to allow postpaid processing, include gas, water, and communication. In the case of gas, water, or communication, the asset information includes information such as ownership of the asset.

Each of the above-described components, like CPU 201, 301, 501, and 901, may be a single device or a plurality of devices.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on Chip (SOC), and graphical processing unit (GPU), and conventional circuit components arranged to perform the recited functions.

Further, the power generator 4*a* (4*b*) may be additionally provided with a smart meter 3*a* (3*b*), or has a function of the smart meter 3*a* (3*b*). Alternatively or additionally, the electric device 8 may be provided with the smart meter 3*c*, or has a function of the smart meter 3*c*.

Further, any of the above-described programs may be stored in a recording medium such as a DVD for distribution.

Further, communication of data between the smartphone 2 (or the smart meter 3), intermediary server 5, and the node 9 may be performed via any other server.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A system, comprising:

a smart meter including first circuitry; and an intermediary server for intermediating transfer of ownership of energy between a supplier and a user, the intermediary server including second circuitry, wherein the first circuitry is configured to:

measure a consumed amount of energy by the user; and repeatedly transmit usage information indicating the consumed amount of energy at regular intervals, the second circuitry is configured to:

communicate with the smart meter and a decentralized ledger system via a network; and repeatedly receive the usage information indicating the consumed amount of energy from the communication terminal, each time the usage information is received, the second circuitry is configured to:

access a transaction details management database storing a planned usage ratio of a specific energy production method associated with a user identifier of the user;

access a transaction history management database storing a history of energy production methods previously allocated to the user;

determine a production method for the consumed amount of energy by executing a set of rules including:

(i) calculating a current energy ratio for the user from the total energy amounts in the transaction history management database, (ii) comparing the calculated current energy ratio to the planned usage ratio from the transaction details management database, and (iii) selecting the production method that directs the user's allocation of energy toward satisfying the planned usage ratio;

update the transaction history management database to include the consumed amount of energy under the selected production method;

transmit, to the decentralized ledger system, a request for changing ownership of an energy asset having the selected production method from a previous owner to the user, wherein the request includes an identifier of the previous owner, the user identifier and the production method, and the decentralized ledger system updates energy asset information based on the request, the energy asset information indicating an owner of the energy asset and a transaction status of the energy asset, by changing the owner to the user and changing the transaction status to transferred; and transmit to the smart meter a response indicating whether processing is successful or unsuccessful, and a subsequent exchange of electricity between the supplier and the user is adjusted according to the updated energy asset information, and the energy asset with the transaction status of transferred is excluded by the intermediary server from a subsequent determination of a production method.

2. The system of claim 1, wherein the decentralized ledger system stores tracking information that instructs each node of a plurality of nodes in the decentralized ledger system to generate energy information, the tracking information associating an owner of the energy and a production method used for producing the energy, and the request includes a request for changing the owner associated with a particular production method of the energy from the previous owner to the user.

3. The system of claim 2, wherein the tracking information instructs each of the plurality of nodes in the decentralized ledger system to include in the energy information an available amount of the energy, the usage information includes a consumed amount of the energy to be subtracted from the available amount of the energy, and the request includes the consumed amount of the energy.

4. The system of claim 2, wherein the energy information indicates, as the production method, one of production of energy using a renewable source, production of energy using fossil fuels, and production of energy using nuclear power.

5. The system of claim 4, wherein when the production method is production of energy using a renewable source, the energy information indicates that the renewable source is one of solar light or solar heat, wind power, biomass, geothermal power, hydropower, atmospheric heat, or a combination thereof.

6. The system of claim 1, wherein the energy is electricity.

7. The system of claim 1, wherein the previous owner is a supplier of the energy or an intermediary agent of the energy.

8. The system of claim 1, wherein a supplier of the energy is a producer of the energy.

9. The system of claim 1, wherein the user is a consumer of the energy.

10. The system of claim 1, further comprising:

the communication terminal which comprises another circuitry configured to transmit the usage information to the intermediary server.

11. The system of claim 1, further comprising:

at least one computer of a plurality of computers on the decentralized ledger system, the at least one computer including another circuitry configured to store tracking information associating an owner of the energy and a production method used for producing the energy.

12. A method for intermediating transfer of ownership of energy between a supplier and a user, the method comprising:

communicating with a smart meter and a decentralized ledger system via a network, the smart meter measuring a consumed amount of energy by the user and repeatedly transmitting usage information indicating the consumed amount of energy at regular intervals;

each time the usage information is received:

accessing a transaction details management database storing a planned usage ratio of a specific energy production method associated with a user identifier of the user;

accessing a transaction history management database storing a history of energy production methods previously allocated to the user;

determining a production method for the consumed amount of energy by executing a set of rules including:

(i) calculating a current energy ratio for the user from the total energy amounts in the transaction history management database, (ii) comparing the calculated current energy ratio to the planned usage ratio from the transaction details management database, and (iii) selecting the production method that directs the user's allocation of energy toward satisfying the planned usage ratio;

updating the transaction history management database to include the consumed amount of energy under the selected production method;

transmitting, to the decentralized ledger system, a request for changing ownership of an energy asset having the selected production method from a previous owner to the user, wherein the request includes an identifier of the previous owner, the user identifier and the production method, and the decentralized ledger system updates energy asset information based on the request, the energy asset information indicating an owner of the energy asset and a transaction status of the energy asset, by changing the owner to the user and changing the transaction status to transferred; and transmitting to the smart meter a response indicating whether processing is successful or unsuccessful, wherein a subsequent exchange of electricity between the supplier and the user is adjusted according to the updated energy asset information, and the energy asset with the transaction status of transferred is excluded by the intermediary server from a subsequent determination of a production method.

13. A non-transitory recording medium storing a plurality of instructions which, when executed by one or more processors, cause the processors to perform a method for intermediating transfer of ownership of energy between a supplier and a user, the method comprising:

communicating with a smart meter and a decentralized ledger system via a network, the smart meter measuring a consumed amount of energy by the user and repeatedly transmitting usage information indicating the consumed amount of energy at regular intervals;

each time the usage information is received:

accessing a transaction details management database storing a planned usage ratio of a specific energy production method associated with a user identifier of the user;

accessing a transaction history management database storing a history of energy production methods previously allocated to the user;

determining a production method for the consumed amount of energy by executing a set of rules including:

(i) calculating a current energy ratio for the user from the total energy amounts in the transaction history management database, (ii) comparing the calculated current energy ratio to the planned usage ratio from the transaction details management database, and (iii) selecting the production method that directs the user's allocation of energy toward satisfying the planned usage ratio;

updating the transaction history management database to include the consumed amount of energy under the selected production method;

transmitting, to the decentralized ledger system, a request for changing ownership of an energy asset having the selected production method from a previous owner to the user, wherein the request includes an identifier of the previous owner, the user identifier and the production method, and the decentralized ledger system updates energy asset information based on the request, the energy asset information indicating an owner of the energy asset and a transaction status of the energy asset, by changing the owner to the user and changing the transaction status to transferred; and transmitting to the smart meter a response indicating whether processing is successful or unsuccessful, wherein a subsequent exchange of electricity between the supplier and the user is adjusted according to the updated energy asset information, and the energy asset with the transaction status of transferred is excluded by the intermediary server from a subsequent determination of a production method.

* * * * *